July 27, 1965
I. L. KAUFFMAN
3,196,704
Y-SLOT BLANK CUTTING MACHINE
Filed Dec. 19, 1958
12 Sheets-Sheet 5
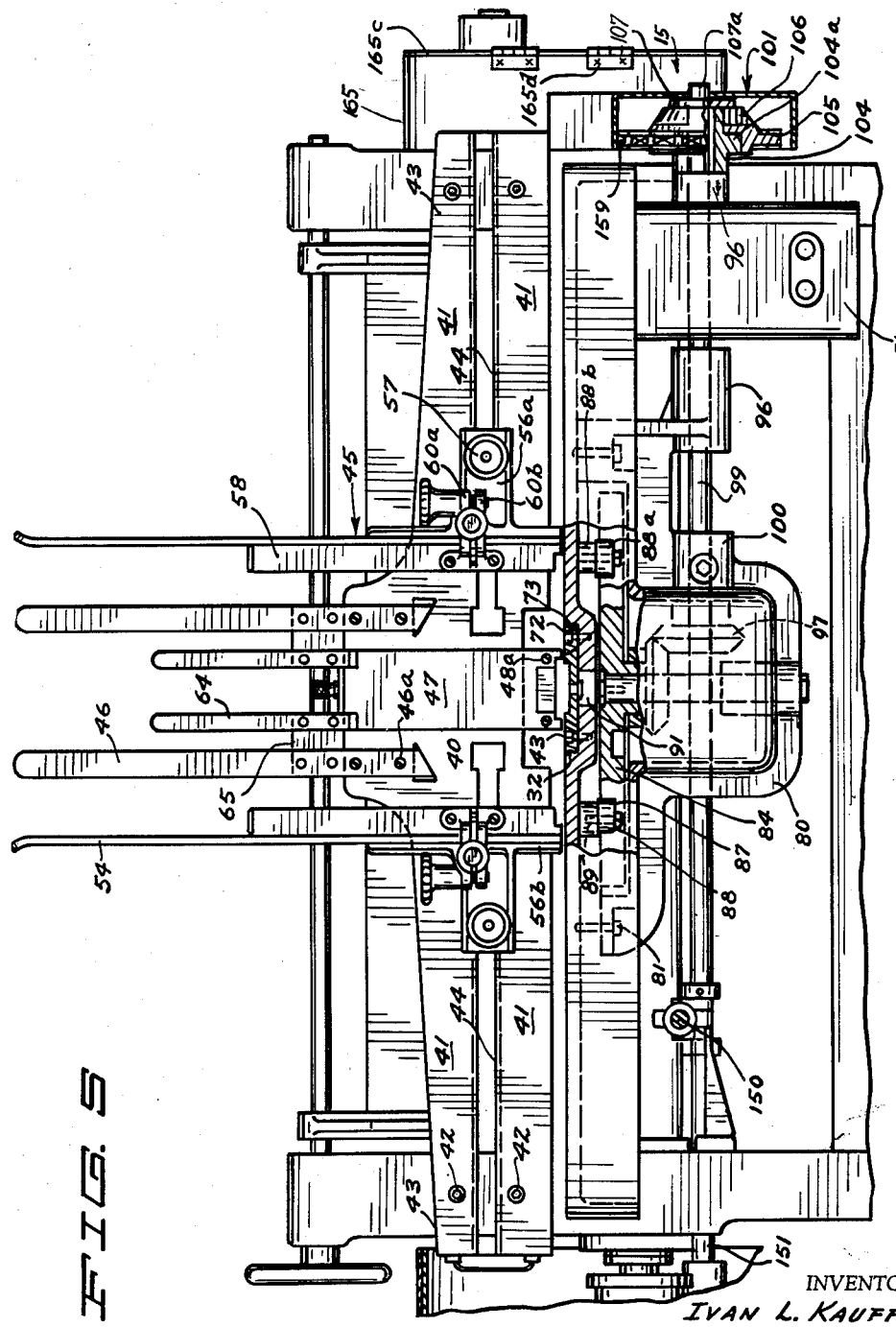
INVENTOR.
IVAN L. KAUFFMAN
BY
Ralph L. Dugger
ATTORNEYS July 27, 1965            I. L. KAUFFMAN            3,196,704
Y-SLOT BLANK CUTTING MACHINE
Filed Dec. 19, 1958            12 Sheets-Sheet 6
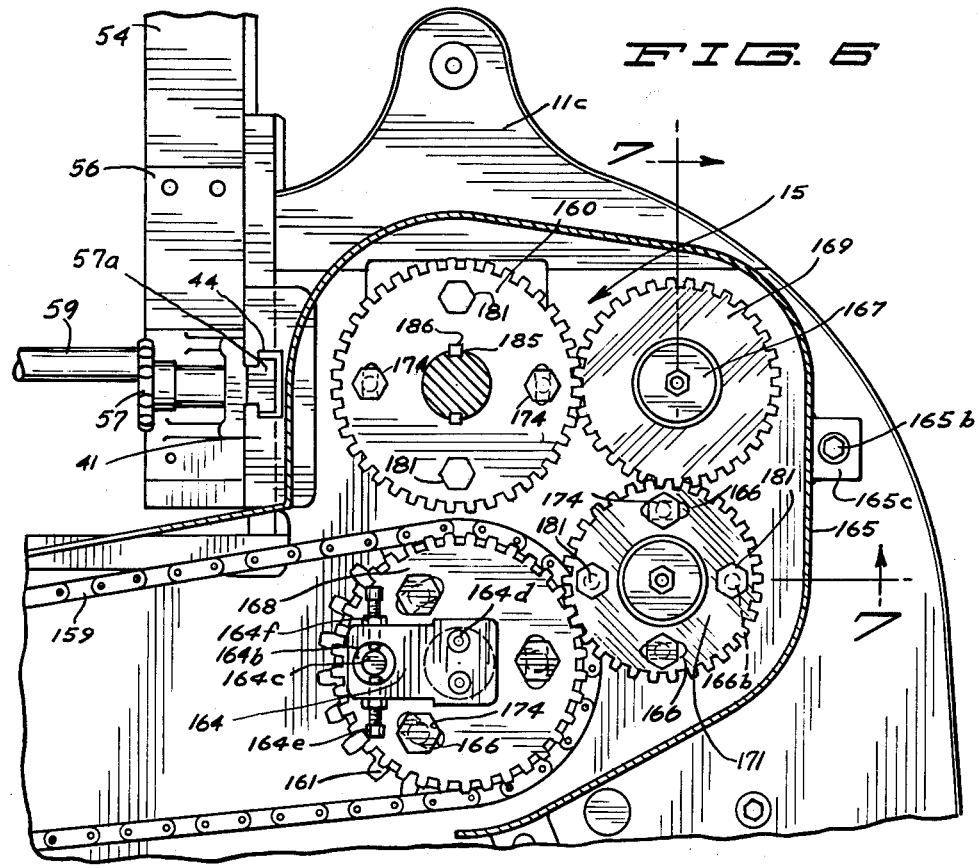
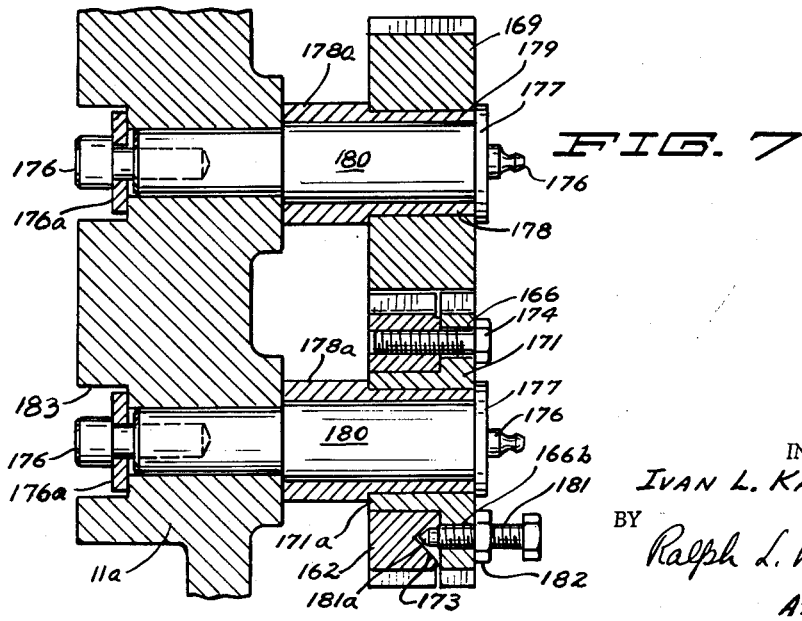
INVENTOR.
IVAN L. KAUFFMAN
BY Ralph L. Dugger
ATTORNEYS

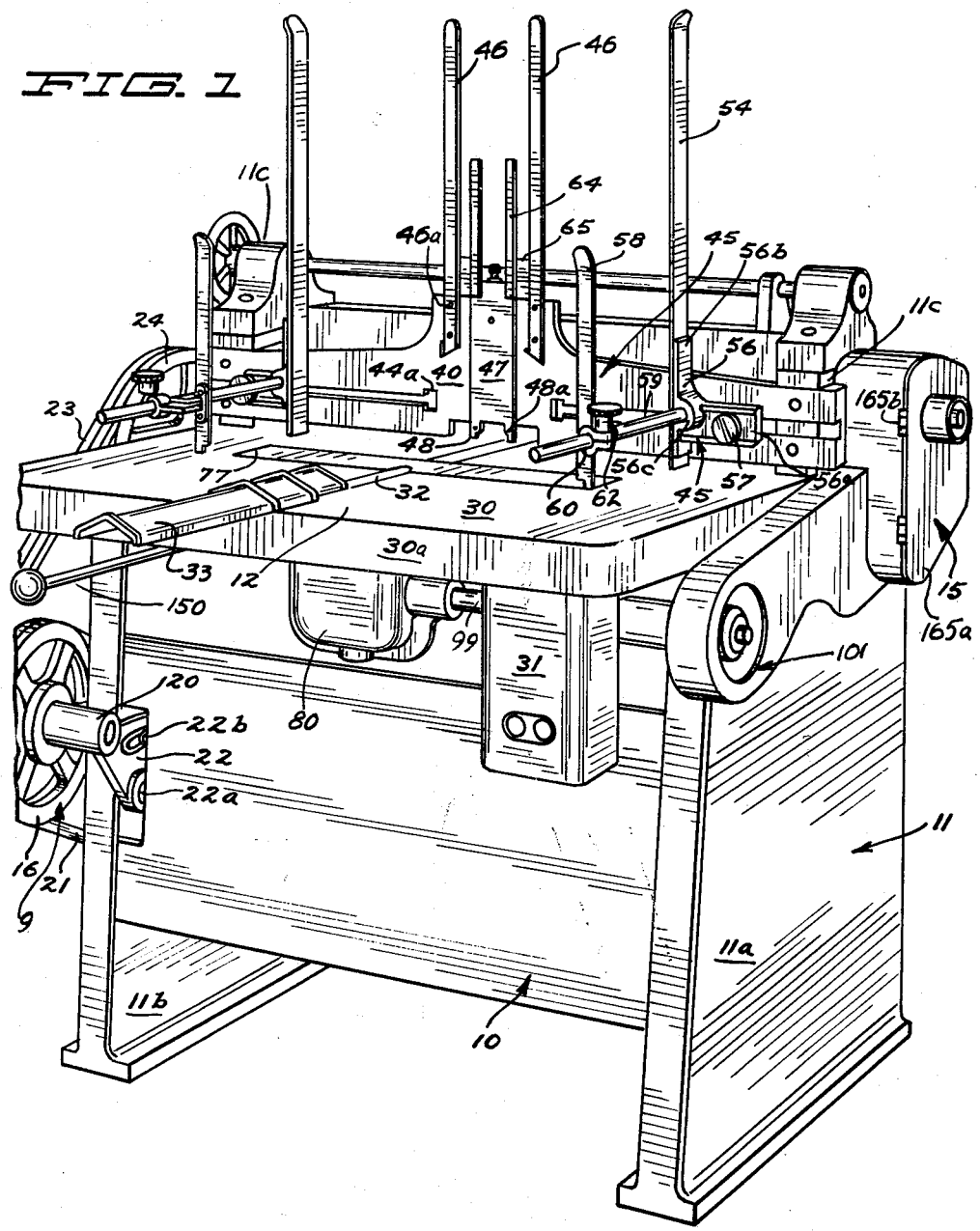

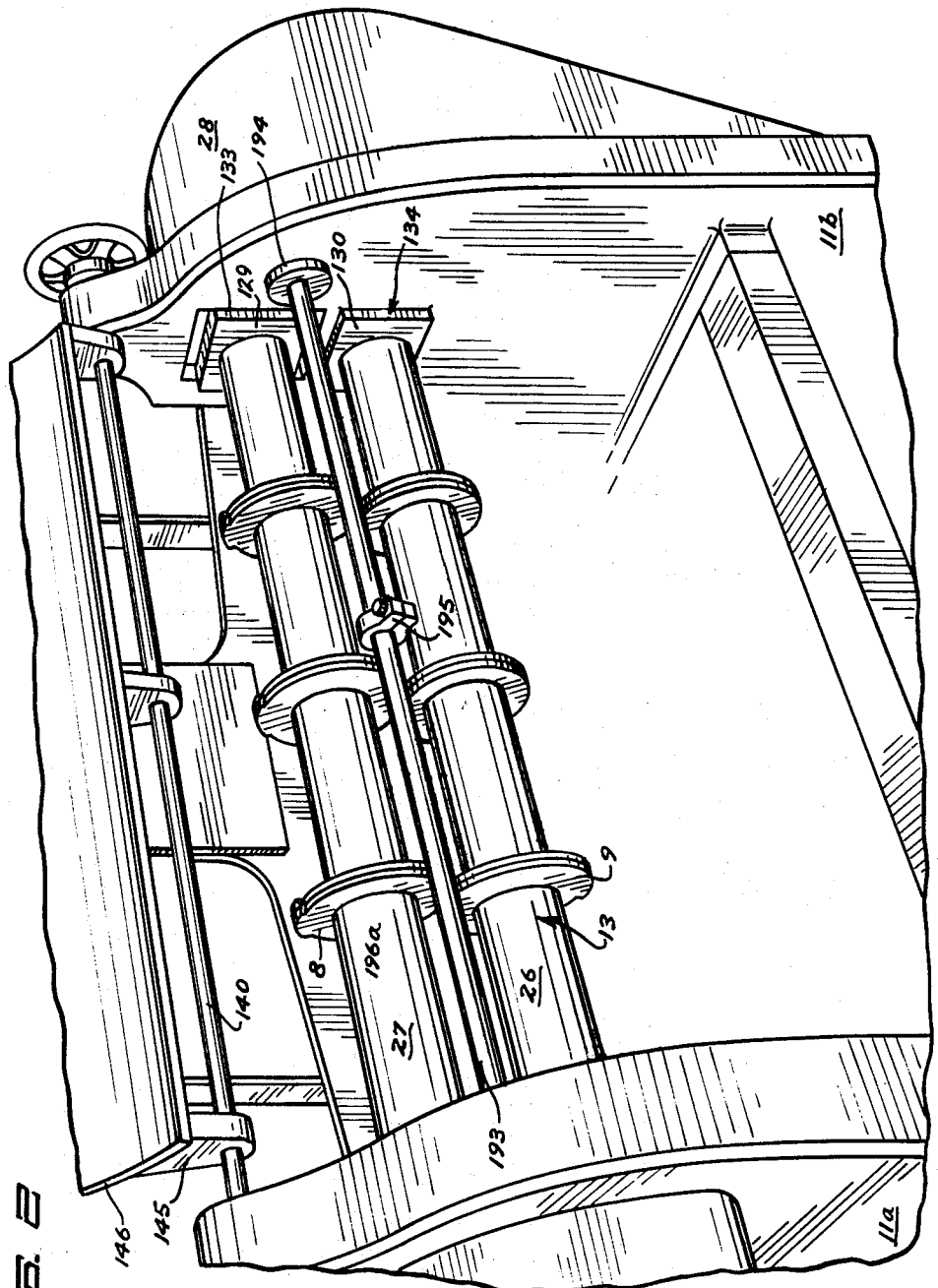

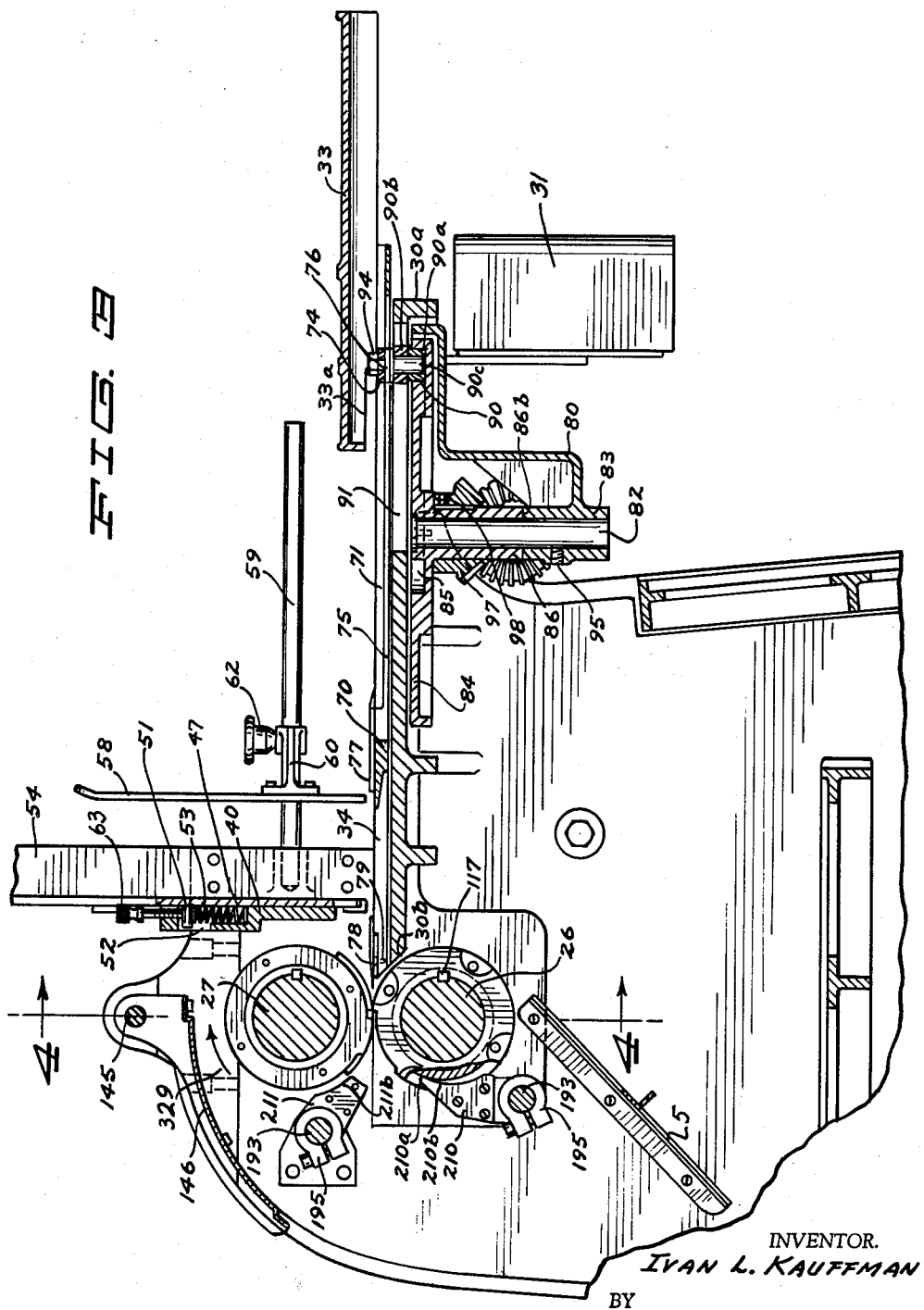

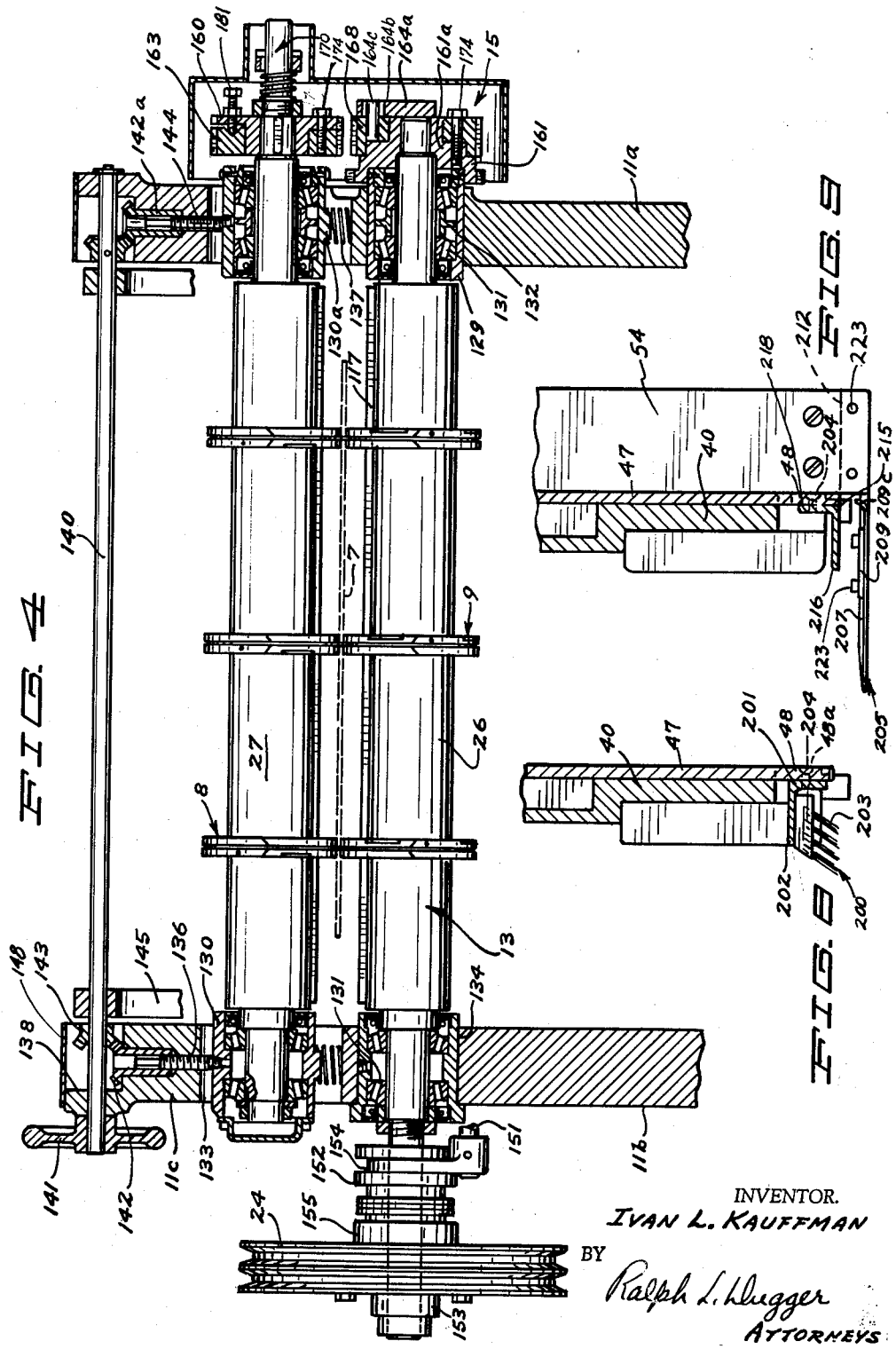

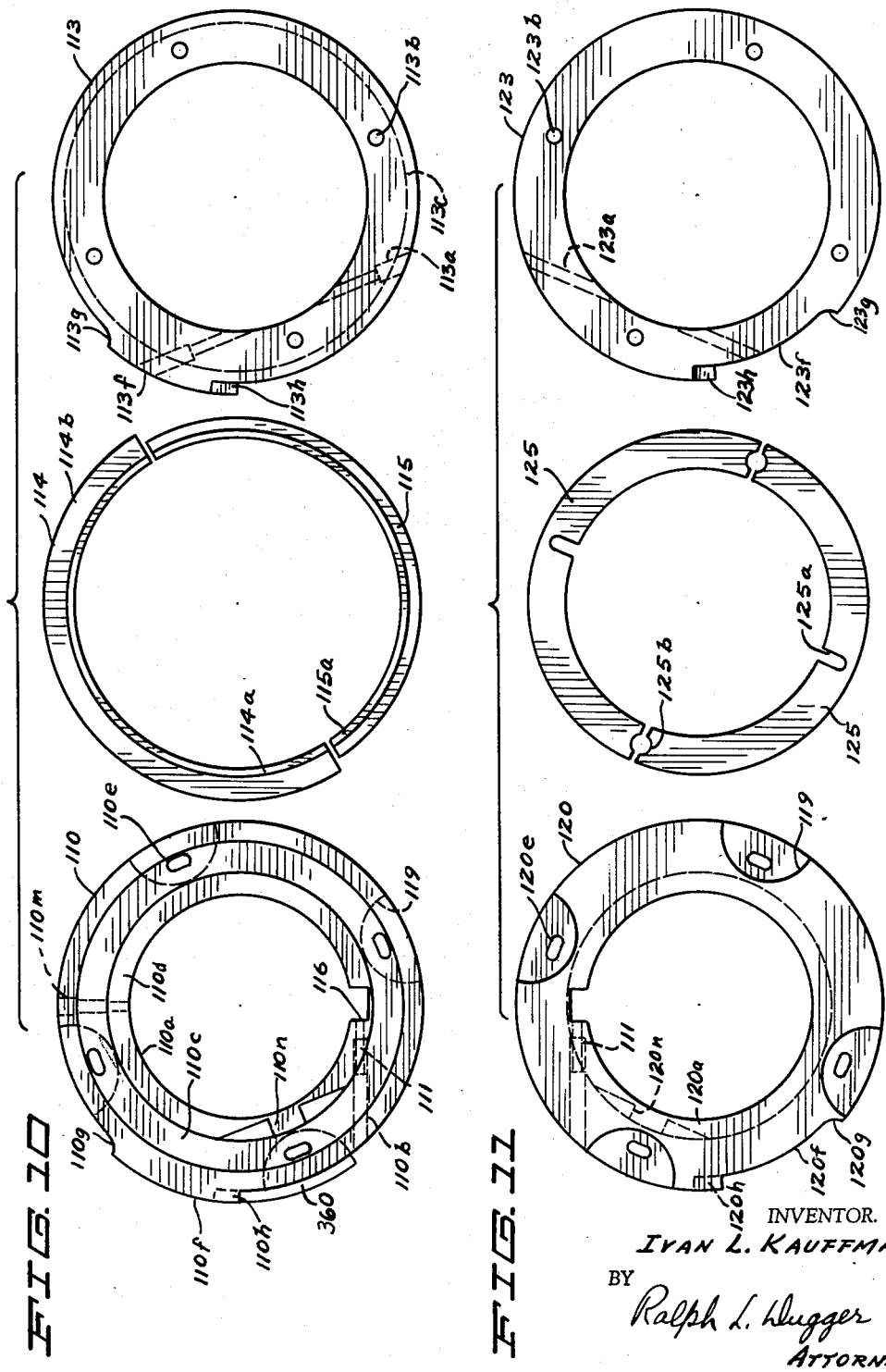

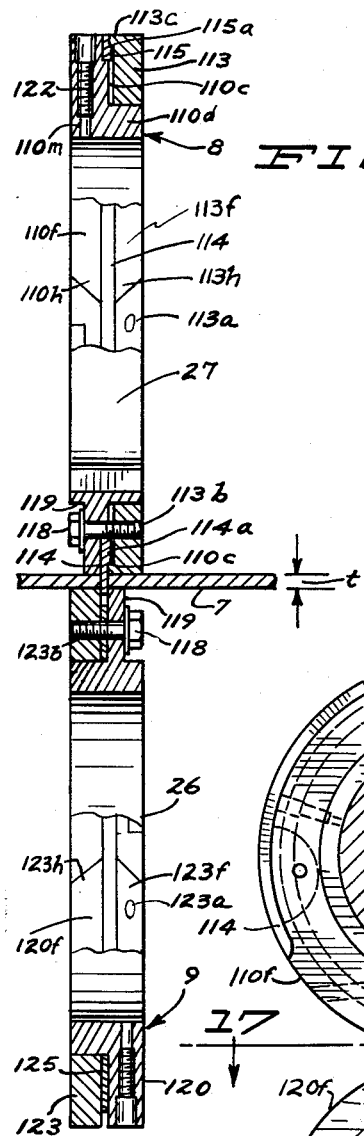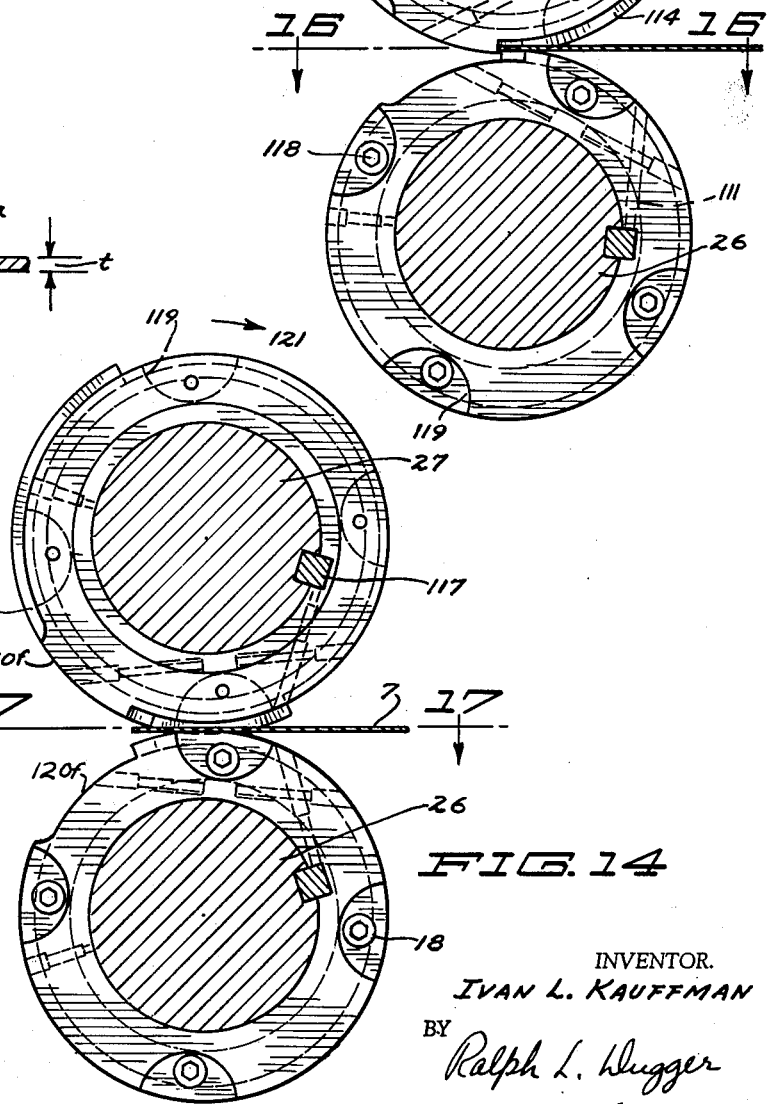

July 27, 1965 I. L. KAUFFMAN 3,196,704
Y-SLOT BLANK CUTTING MACHINE
Filed Dec. 19, 1958 12 Sheets-Sheet 9
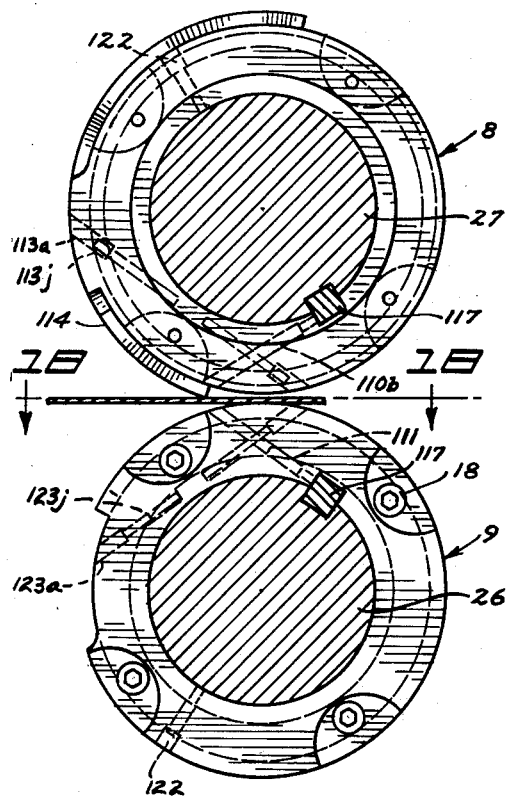
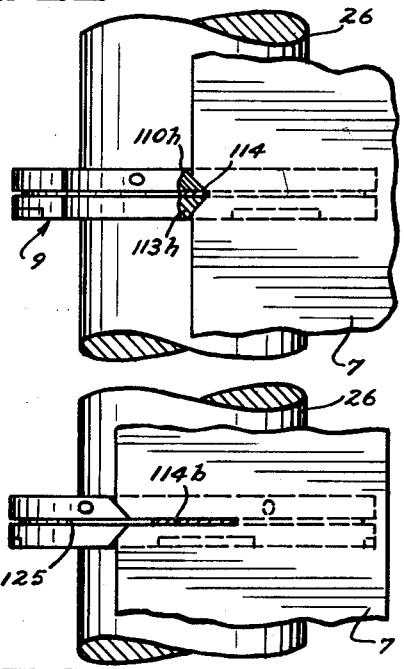
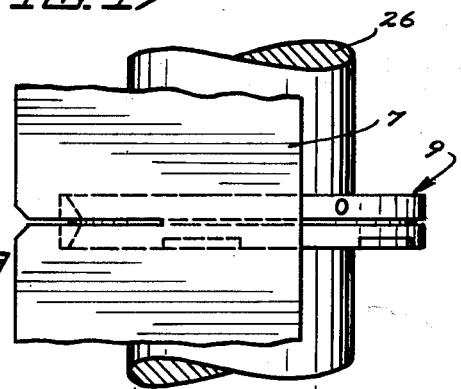
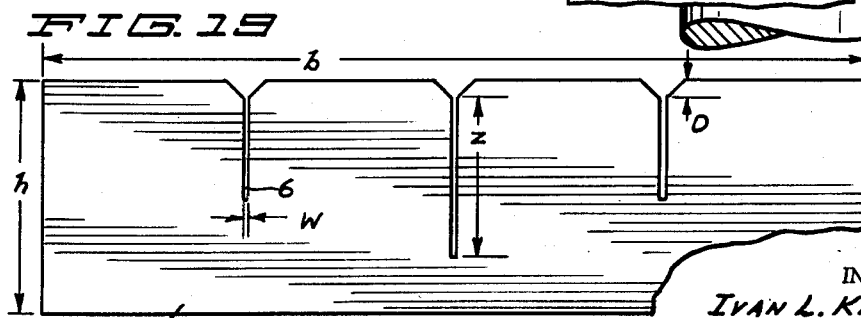
INVENTOR.
IVAN L. KAUFFMAN
BY
Ralph L. Klugger
ATTORNEYS

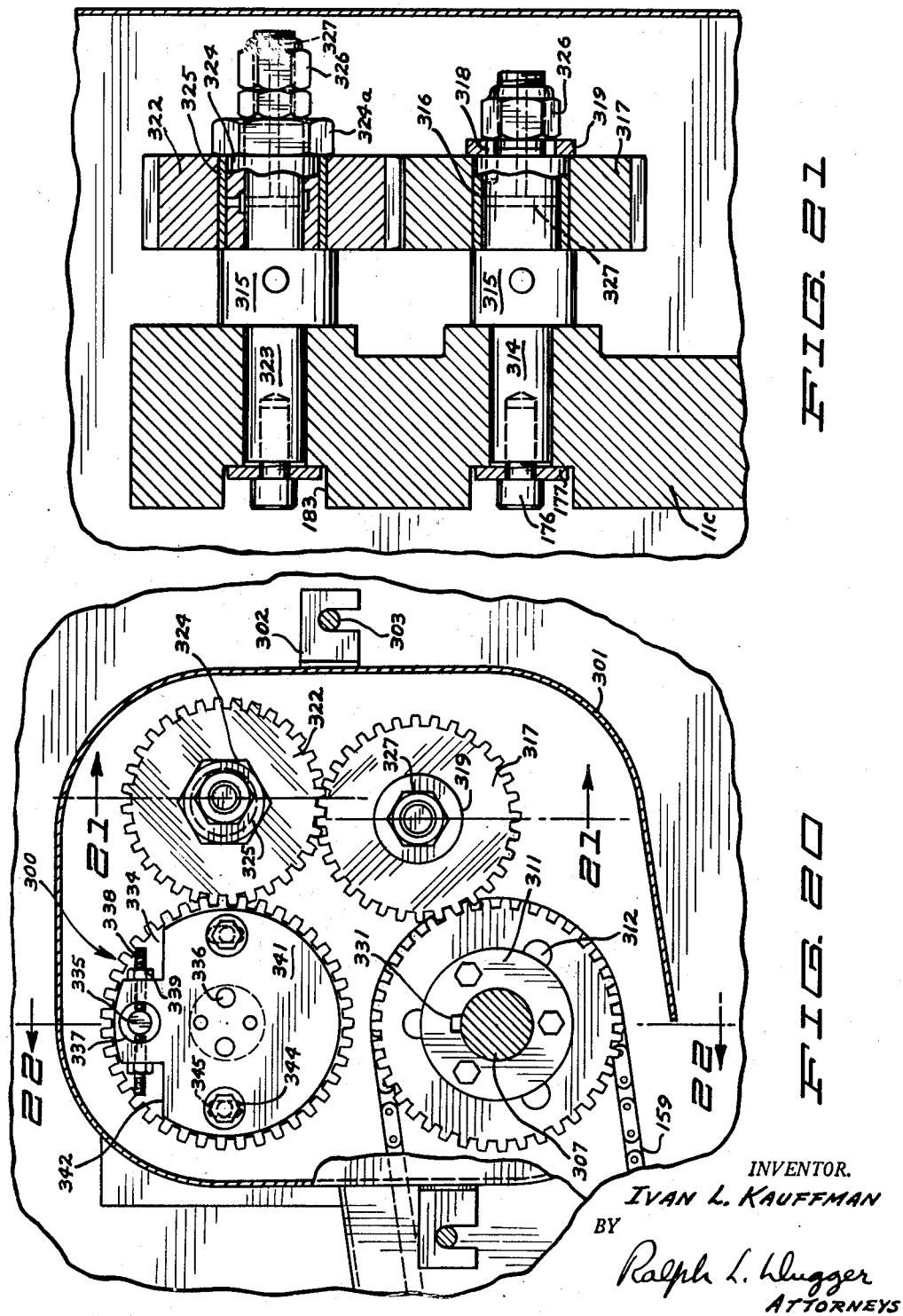

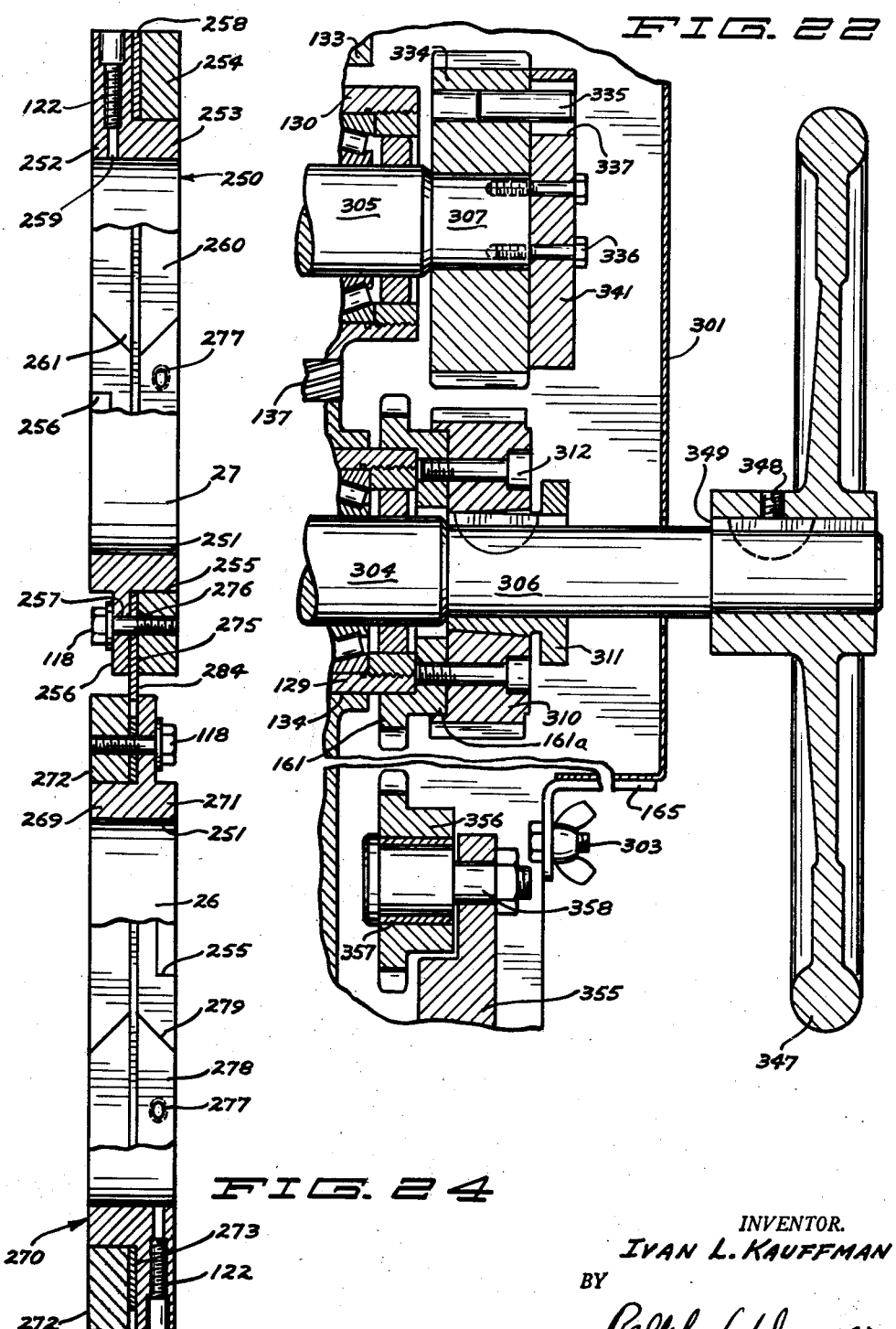

July 27, 1965  I. L. KAUFFMAN  3,196,704
Y-SLOT BLANK CUTTING MACHINE
Filed Dec. 19, 1958  12 Sheets-Sheet 12
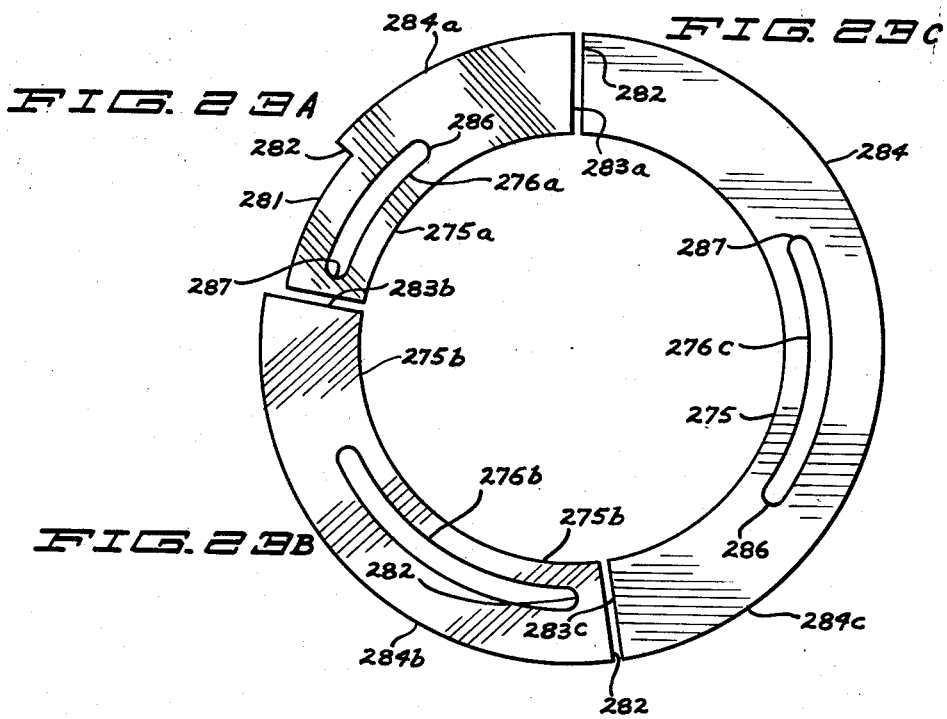
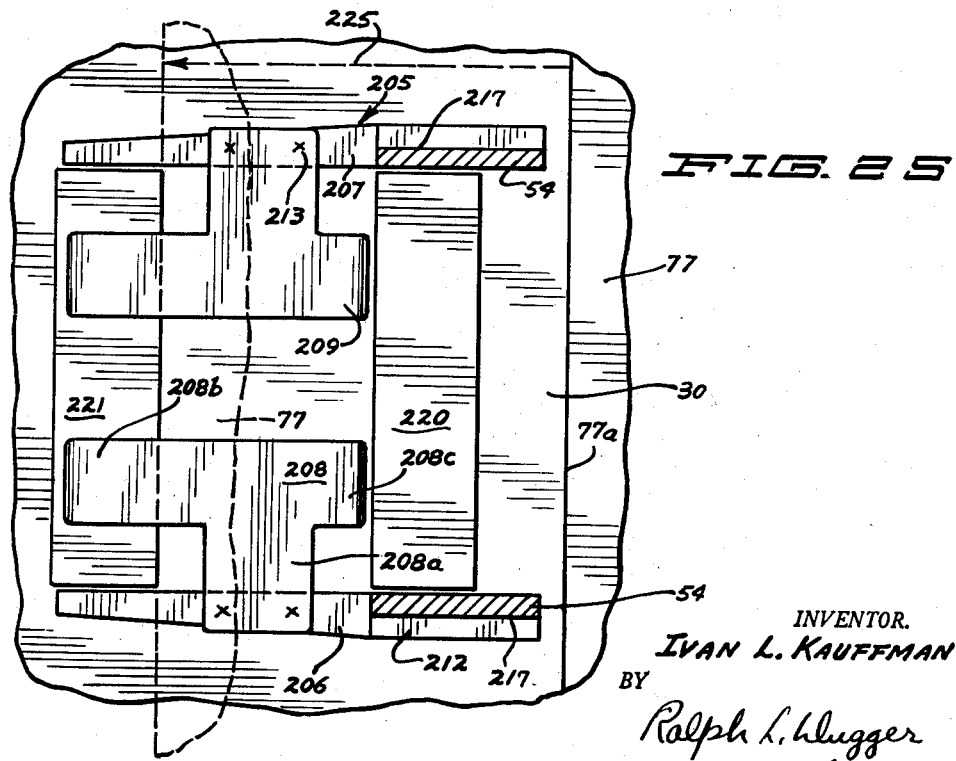
INVENTOR.
IVAN L. KAUFFMAN
BY
Ralph L. Chugger
ATTORNEYS

United States Patent Office 3,196,704
Patented July 27, 1965

3,196,704
Y-SLOT BLANK CUTTING MACHINE
Ivan L. Kauffman, Minneapolis, Minn., assignor, by mesne assignments, to Ex-Cell-O Corporation, Detroit, Mich., a corporation of Michigan
Filed Dec. 19, 1958, Ser. No. 781,721
8 Claims. (Cl. 83—345)

This invention relates to new and novel apparatus for forming Y-entry slots in box blanks. More particularly this invention relates to fully adjustably Y-entry knife assemblies, apparatus for rotatably mounting said assembly, and apparatus for automatically feeding blanks to have Y-entry slots cut therein by said knife assemblies.

In the prior art, cutting Y-entry slots in a partition for a box has been a two-stage operation in which first an elongated slot is cut in the blank and then the blank is sent through a machine to have a V-shaped notch cut at the forward edge of the elongate slot such that a Y-entry slot is formed in said blank; or else a reciprocal punch is used for forming said Y-entry slot in the blank. Using the former method of forming the Y-entry slot in a blank involves a two-stage operation whereas the second method required the use of reciprocating equipment. Either of the two above mentioned methods or combinations of said methods of forming Y-entry slots require a substantially greater time to form said slots than that required by using the apparatus of the present invention. Further, there are no teachings in the prior art of providing Y-entry knife assemblies that are fully adjustable for cutting Y-entry slots in a plurality of blanks in a continuous operation at relatively high speeds.

One of the objects of this invention is to provide new and novel apparatus for cutting Y-entry slots in a plurality of blanks in a continuous operation. A further object of this invention is to provide new and novel apparatus whereby the dimensions of the Y-entry slots to be cut in blanks may be varied by a few simple adjustments. That is, the length of the slot, the width of the slot, and/or the depth of the V-shaped portion of the Y-slot may be varied by making a few simple adjustments and/or interchanging a portion of the knife assemblies, said adjustment or interchange requiring a relatively short time interval to be made.

A still further object of this invention is to provide rotatably mounted Y-entry knife assemblies made up of at least one male and one cooperating female member for cutting Y-entry slots, said male and female members constituting a cooperating pair of knife assemblies. The male member is to include a slot cutting element which may be readily adjusted to vary the length of the slot to be cut in a blank. Additionally the male and female members are to be constructed such that the slot cutting element of the knife assembly may be readily interchanged with another slot cutting element for varying the width of the slot, said interchange requiring only a few simple operations.

Still an additional object of this invention is to provide a pair of cooperating rotatably mountable knife assemblies for forming Y-entry slots, wherein one of said assemblies includes a pair of knife blade mounting members having a flange portion to adjustably retain an appropriately shaped knife blade therebetween. Another object of this invention is to provide a pair of cooperating rotatably mounted knife assemblies for forming Y-entry slots wherein one of said assemblies includes a pair of knife blade mounting members and a plurality of interchangeable knife blades for forming slots in different height ranges. Still another object of this invention is to provide a plurality of knife blades in different height ranges wherein each blade is adjustably positionable in an appropriate mounting member for forming a slot of any height within its respective height range. A still further object of this invention is to provide a pair of cooperating knife assemblies to be rotatably mounted, said assemblies each being made up of adjustable, positionable portions to provide adjustments to yield a clean cut "V" notch portion in a Y-entry slot.

Additionally it is an object of this invention to provide structure whereby the spacing of the male and female members of the Y-entry knife assemblies may be varied to make provision for cutting Y-entry slots in blanks of different thicknesses, said blanks to be passed between the Y-entry knife assemblies for forming the slots therein. Further, it is an object of this invention to provide mechanism to vary the depth of the V portion of the Y-slot cut in blanks by the slotting apparatus.

Still further it is an object of this invention to provide anti-backlash mechanism to minimize the backlash in the gears driving the Y-entry knife assembly shafts.

Additionally it is an object of this invention to provide new and novel mechanisms for minimizing the amount of backlash in the driving connections between the coperating knife assembly mounting shafts of a slotting machine, said mechanism including a plurality of gears mounted on the same shaft which are adjustably positionable with respect to one another. Still another additional object of this invention is to provide mechanism for minimizing the backlash in the gear driving connections between the cooperating pair of knife assembly mounting shafts of a slotting machine, said mechanism including eccentric adjustment members.

Further, it is an object of this invention to provide hand operated means for rotating the eccentric anti-backlash mechanism for making appropriate adjustments thereof.

Additionally it is an object of this invention to provide apparatus for rotating the knife assembly shafts which automatically disengages when the machine is operated under power, said apparatus to facilitate making adjustments of the machine.

Still another objective of this invention is to provide a fine control for varying the closeness of intermeshing of the respective male and female knife assemblies used for cutting Y-entry slots in box blanks so as to provide a positive cutting control of said knife assemblies. Still a further objective of this invention is to provide a fine adjustment for adjustably varying the relative angular position of the knife assembly mounting shafts after the drive connections have been made.

Further it is an object of this invention to provide apparatus for cutting a plurality of Y-entry slots of different dimensions in a single blank. Still further it is an objective of this invention to provide apparatus for cleaning the Y-entry knife assemblies as they rotate, said apparatus to free the material cut out of the slots from the knife assemblies.

Another objective of this invention is to provide apparatus for forming Y-entry slots in very thin blanks and also in relatively narrow blanks. A further objective of this invention is to provide a hold-down attachment for slot forming apparatus that includes a brush for retaining a plurality of narrow blanks in alignment between the blank feeding mechanism and the slot forming members. An additional objective of this invention is to provide a hold attachment for slot forming apparatus that includes side guides for retaining a plurality of narrow blanks in alignment between the blank feeding mechanism and the slot forming members.

Other and further objectives are those inherent in the invention herein illustrated, described in the claims, and will be apparent as the description proceeds.

To the accomplishment of the foregoing and related ends, this invention then comprises features hereinafter fully described and particularly pointed out in the claims, the following description setting forth in detail certain illustrative embodiments of the invention, these being indicative, however, of but a few of the various ways in which the principles of the invention may be employed.

The invention is illustrated by reference to the drawing in which the corresponding numerals refer to the same parts and in which:

FIGURE 1 is a perspective view of the forward end of the Y-entry slot blank cutting apparatus;

FIGURE 2 is a fragmentary perspective view of a slotter portion of the Y-entry blank cutting apparatus illustrating the mounting of a plurality of pairs of Y-entry knife assemblies for cutting Y-entry slots in a blank;

FIGURE 3 is a partial side sectional view of this invention illustrating the mounting of a pair of cooperating Y-entry knife assemblies and the mechanism for continuously feeding blanks to be slotted to the Y-entry knife assemblies;

FIGURE 4 is a partial sectional view of this invention taken along the line and looking in the directions of the arrows 4—4 of FIGURE 3, said view showing the first embodiment of the mechanism for varying the spacing of the knife assemblies, the amount of backlash and the relative position of intermeshing of a cooperating pair of knife assemblies;

FIGURE 5 is a front partial sectional view of this invention taken along the line and looking in the direction of the arrows 5—5 of FIGURE 2 to illustrate the feed mechanism, the blank holder mechanism and the mechanism for varying the depth of the V-notch in a Y-slot;

FIGURE 6 is an enlarged partial side view of the invention illustrating the gearing for driving the knife assembly mounting shafts including the structure of the first embodiment for adjusting the amount of backlash and making the micrometer adjustment;

FIGURE 7 is an enlarged vertical sectional view of this invention taken along the line and looking in the direction of the arrows 7—7 of FIGURE 6 to illustrate the first embodiment of the anti-backlash adjustment mechanism;

FIGURES 8 and 9 are vertical sectional view of two embodiments of hold-down or shoe attachments that may be connected to the slide gate mechanism when the blanks are of a height that is less than the distance between the slide gate and the center of the knife assembly mounting shafts. The embodiment illustrated in FIGURE 8 includes brushes for holding the blanks in a horizontal plane whereas the embodiment illustrated in FIGURE 9 shows solid metal members for performing the same function;

FIGURE 10 shows the male Y-entry knife assembly of the first embodiment disassembled to illustrate the structural features of the component parts thereof;

FIGURE 11 shows a female Y-entry knife assembly of the first embodiment disassembled to illustrate the structural features of the component parts thereof;

FIGURE 12 shows a cross sectional end view of the male and female Y-entry knife assemblies of the first embodiment with a blank position therebetween, said view illustrating the mounting of the respective component parts of each knife assembly and of the assemblies mounted on their respective shafts;

FIGURES 13 to 15 inclusive show a side view of the pair of cooperating Y-entry knife assemblies mounted on their respective shafts for rotation with a blank positioned between said knife assemblies. FIGURE 13 shows the position of the blank between a pair of Y-entry knife assemblies immediately after the knife assemblies have started to cut the V-shaped portion of the Y-entry slot. FIGURE 14 illustrates the relative positions of the blank and the Y-entry assemblies as the elongated portion of the slot is being formed in said blank. FIGURE 15 illustrates the position of the blank between a pair of knife assemblies immediately after the slotted portion has been cut in said blank;

FIGURES 16 through 18 inclusive illustrate top views of a blank and the female member of the Y-entry knife assemblies, said view being taken along the line and looking in the direction of the arrows 16—16, 17—17, and 18—18 of FIGURES 13 to 15 respectively. The portion of the male knife that is cutting the slot in the blank in the aforementioned positions is shown in section;

FIGURE 19 illustrates a blank that has a plurality of Y-entry slots cut therein to show that the length, the width, and the angle of the V portion of the Y-slot may be of different dimensions for each of the respective slots which is cut in the blank during a single passage through the slot cutting mechanism;

FIGURE 20 is an enlarged fragmentary side view of a second embodiment of the cutting control and anti-backlash mechanism of this invention, said view including eccentric adjustment members for varying the amount of backlash between the gears and for making a micrometer adjustment, and being similar to the view illustrated in FIGURE 6 of the first embodiment of said mechanism;

FIGURE 21 is an enlarged vertical sectional view of the invention taken along the line and looking in the direction of the arrows 21—21 of FIGURE 20 to illustrate the second embodiment of the anti-backlash adjustment mechanism, said view showing the eccentrically mounted gear members that drivenly connect the gears on the female knife mounting shaft to the gears on the male knife mounting shaft;

FIGURE 22 is an enlarged vertical sectional view of the invention taken along the line and looking in the direction of the arrows 22—22 of FIGURE 20 to illustrate a portion of the second embodiment of the anti-backlash and cutting control adjustment, said view illustrating the micrometer adjustment and the hand wheel for rotating the knife mounting shaft when various adjustments are being made;

FIGURES 23A, 23B, and 23C illustrate three different knife blades of the second embodiment of the male knife assembly; the knife blade of FIGURE 23A being used for forming slots in the range of relatively small slot heights, the knife blade at 23B being used for forming slots in the range of intermediate slot heights, and the knife blade of FIGURE 23 being used for forming slots in the range of relatively large slot heights;

FIGURE 25 is a fragmentary top view of the invention, said view illustrating the second embodiment of the blank hold-down means along with illustrating the stroke length of the feed plate and a blank at the end of said stroke;

FIGURE 24 shows a sectional end view of a second embodiment of the male and female Y-entry knife assemblies of this invention, said view illustrating the mounting of the respective component parts of each of the knife assemblies with said assemblies being mounted on their respective shafts.

Referring now to the drawings, particularly to FIGURES 1 and 2, there is shown a perspective view of the forward end of the Y-entry slot cutting apparatus and of the rearward end showing the slotting mechanism thereof, the apparatus being generally designated 10. For the purpose of convenience in describing the apparatus, said apparatus will be considered as being made up of the following portions: frame 11, feed mechanism 12, slotter section 13, anti-backlash and cutting control mechanism 15 and power drive means 9. The power drive means 9 (FIGURE 1) is mounted on the left side of the frame 11, said power means including a motor (not shown) mounted on the frame for driving the pulley 16 through pulley belt 21. The pulley 16 is mounted on a shaft 19, said shaft being journalled for rotation in hub 20. The hub 20 is firmly secured to a mounting base 22, the mounting base being pivotally secured to the base 11 by pivot pin 22a and firmly held in an adjusted pivoted position by pulley adjustment bolt 22b. The belt 23 connects pulley 16 to pulley 24, the latter pulley being mounted on the female knife assembly shaft 26. A guard 28 encloses the aforementioned pulleys and belts.

A horizontal rectangular table 30 is mounted on the frame such that the forward edge 30a thereof extends outwardly beyond a vertical plane passed through said frame; and the opposite or rear edge 30b extends rearwardly to a point adjacent to the slotter section 13. A motor starter housing 31 having appropriate electric leads (not shown) connected to the motor and to an electrical source is mounted on the lower forward portion of the table.

A transverse groove 32 extending substantially width of the table is formed in the upper center portion of said table. A generally U-shaped cover 33 is mounted on the top surface of the table such that it may be moved to cover the groove and to cover mechanism that extends outwardly beyond the front edge of the frame during the operation of the machine, said mechanism to be described hereinafter. An elongated feed plate 77, elongated in a direction perpendicular to the groove, is connected to the aforementioned mechanism, said feed plate being mounted for translator movement on the top surface of the table.

Formed integral with the side portions 11a and 11b of the frame are mounting blocks 11c. The mounting blocks have appropriate slots and apertures formed therein for mounting structure to be described hereinafter.

A vertical plate 40 having a pair of elongated extensions 41 formed integral with either side thereof is mounted on and between the mounting blocks. Each of the extensions has an aperture in its outer end portion such that bolts 42 may be used to secure the extensions in appropriate slots 43 formed in the forward vertical portion of the mounting blocks 11c. The adjacent horizontal surfaces of each of the pairs of the elongated extensions form a guideway 44 for slideably mounting a blank guide assembly 45 therein. The slots are enlarged at 44a adjacent to the central portion of the plate 40 so that the guide assemblies may be removed.

A pair of spaced, elongated, vertically extending back guides 46 are secured on the central portion of the plate 40 by cap screws 46a. A control gate or slide gate 47 having a forward rectangular planar surface in the same plane as the forward surface of the guides 46 is slideably mounted in a recessed portion formed in the plate between said guideways, said recessed portion extending the height of the vertical plate. A pair of spaced apart ears 48 having apertures 48a are formed integral with the bottom edge of the control gate such that attachments described hereinafter may be secured to said control gate.

A pair of spaced, back short vertical guides 64 extend upwardly beyond the raised position of the control gate. Each short guide 64 is secured to a plate 65, said plate being secured to the back guide adjacent to the respective short guide. The short guides form bearing surfaces for holding the back edges of blanks of relatively short lengths in place.

An offset 51 (FIGURE 3) is secured to the midportion of the control gate such that it may be moved in a vertical direction in the recess 52 formed in the front surface of the plate 40. An adjustment bolt 63 is threaded in the vertical opening formed in the plate to engage the top surface of the offset to push the offset downwardly against the upward force exerted against the lower surface of said offset by the spring 53, said spring being set against the bottom surface of recess 52. The adjustment bolt controls the vertical height of the lower horizontal surface of the control gate above the surface of the table.

The guideway assembly 45 includes a generally T shaped bracket 56 having an aperture in the straight leg 56a for inserting bolt 57 therethrough for slideably attaching said bracket to the vertical plate. The bolt 57 extends through the guideway slot 44 and is threaded into a gib 57a located on the opposite side of the vertical plate from said T shaped bracket. Vertically elongated side guides 54 having a planar surface generally perpendicular to the planar surface of the vertical plate 40 are secured to the cross bar portion 56b of said T bracket. An enlongated horizontal rod 59 is secured in an offset 56c formed integral with the cross bar portion, said rod being positioned above and extending parallel to the surface of the table, and also extending outwardly from and perpendicular to the planar surface of the verical plate.

A front guide 58 which is elongated in a vertical direction and has a planar surface parallel to the surface of the vertical plate is secured to a clamp 60. The clamp 60 is slideably retained in position on rod 59 by a clamp bolt 62 that is inserted through an aperture formed in the upper leg 60a of the clamp and threaded into an aperture formed in the lower leg 60b of said clamp. Thus by loosening the clamp bolt 62, the front guide may be adjustably positioned along the length of the horizontal rod.

From the foregoing it may be seen that the side guides 54 may be spaced apart from or closer to one another while at the same time the front guides may be independently adjusted either closer to or further from the vertical plate 40. Thus the guides may be properly positioned to firmly hold a stack of box blanks 220 in position to be fed to the slotter mechanism.

The guide assembly having been described, the structure for feeding said blanks into the slotter mechanism will now be set forth. An elongated slide bar 70 (see FIGURE 3) having an elongated slot 71 formed in the central portion thereof is slidably mounted in the groove 32. The slide bar is retained in said groove by gibs 73, there being one gib positioned on either side of said slide bar in the groove. The gibs are secured to the table by cap screws 72 which are inserted in apertures formed in the gibs and secured in threaded apertures formed in the table.

A shoulder 75 is formed within the slotted slide bar to extend around the perimeter of the slot 71. A roller 74 having a vertical axis of rotation is rotatably mounted for traveling the length of the slot, the lower peripheral portions of the roller being supported on shoulder 75. The roller 74 is rotatably mounted on shaft 76, said shaft extending in a vertical direction.

A slotted portion 33a is cut out of the vertical walls of the cover 33 forward of the shaft 76 so that the feed plate 77 may be retracted beneath an end portion of said cover. The cover extends forwardly of the table to form a guard to prevent injury to a person when the slide bar reciprocates in the groove. The cover is pivotally mounted on the table.

A guide plate 78 is mounted on the forward edge 30b of the table adjacent to the Y-entry knife assemblies, said guide plate 78 being secured to the table by screws 79. As may be noted in FIGURE 3 the forward edge of the guide plate extends outwardly beyond the edge of the table to a point adjacent where the appropriate elements of Y-entry knife assemblies intermesh. It also should be noted that the forward edge of the table is concaved so as to overlay a portion of the female knife assemblies, thus providing a structure for supporting blanks of a relative narrow height as they are fed between the rotating knife assemblies.

Mounted under the central rear portion of the table is cam gear housing 80 (see FIGURES 3 and 5), said housing being secured to the table by bolts 81 and members 88a, 88b, and 88. A vertical cam gear shaft 82 is fixedly mounted in collar 83 by a set screw 95, said collar being formed integral with the bottom wall of the cam gear housing. Mounted for rotation on the top end of the cam shaft 82 and within the housing 80 is a generally horizontal cam 84 having a generally heart-shaped channel 85 formed in the top surface thereof. A vertical tube 86 formed integral with the cam 84 and depending therefrom enclosed the upper peripheral surface of the shaft 82, said tube aiding in stabilizing the cam on the shaft. The lower edge 86b of the tube bears on the upper edge of the collar 83 and thus supports the cam in position beneath the table.

A cam follower 90 having a lower follower roller 90a mounted in the heartshaped channel 85 is mounted on a shaft 90c that extends upwardly through slot 91 formed in the table. A roller 90b is rotatably mounted on shaft 90c such that its circumerential portions bear against the walls of slot 91 while it rotates, slot 91 being located beneath slot 71. The upper end of the shaft 90c is integrally connected to the lower end of the shaft 76. A nut 94 is threaded on the upper end of the shaft 76 so that the roller 74 many be forced down against the shoulder portion 75 of the slide bar 70 and also against the small roller 90d located between roller 74 and roller 90b. The small roller has a diameter slightly smaller than the width of the slot 71 which is formed in the shoulder 75. By tightening the nut 94, the portion of the shoulder located between the rollers 74 and 90b is maintained therebetween since said shoulder is firmly held in place relative to said rollers.

Thus as the cam follower is moved as a result of rotation of the cam 84, the rotary motion of the cam is changed to reciprocal motion in the slide bar. By loosening the nut 94, the slide bar may be reciprocated freely with respect to the cam follower, thereby providing for adjustably positioning the feed plate independent of the rotation of the cam. For example, if blanks of a relatively large height were to be slotted, the cam may be rotated to bring the slide bar to its rearmost position. Next the nut 94 would be loosened, the slide bar would be moved away from the Y-entry knife assemblies and the nut would again be tightened to retain the slide bar in the proper adjusted position. Thus, provision is made for slotting blanks of different heights.

An angle gear 97 for driving the cam is secured in place on the tube 86 by a set screw 98. The gear 97 is driven by a second angle gear 97 which is mounted at right angles thereto on the drive shaft 99. The drive shaft is journalled for rotation in bushing 100 and bearing 96, said bushing being mounted in the cam gear housing and said bearing 96 being secured to the under surface of the table.

The drive shaft extends outwardly through an appropriate aperture in the frame side wall to a feed timing mechanism, generally designated as 101. The feed timing mechanism includes a sprocket 105 drivenly connected by the chain 159 to an appropriate female drive gear 161 mounted on the female knife assembly shaft. The sprocket 105 having an appropriately shaped central aperture is rotatably mounted on a disk 104, said disk being keyed on the drive shaft 99. The disk has a shoulder 104a to prevent the sprocket from being moved in a horizontal direction toward the frame.

Also mounted on the drive shaft in engagement with the outer vertical surfaces of the sprocket 105 and the disk 104 is a dial 106. A bolt 107a threaded into the outer end of the shaft has a washer 107 mounted thereon that bears against the vertical surface of the disk. By tightening the bolt 107a, the washer 107 forces the dial inwardly against the sprocket, said sprocket in turn being forced into tight frictional engagement with the disk such that it will cause the disk to rotate and drive the shaft 99. The purpose of providing the feed timing mechanism will be described thereinafter.

The structure of the feed timing mechanism having been set forth, the slotter mechanism will now be described. For purposes of facilitating the description of said mechanism it will be assumed that the first embodiment knife assemblies 7, 8 is being used. The female Y-entry knife assembly shaft 26 and the male Y-entry knife assembly shaft 27 are journalled for rotation in appropriate structure mounted in appropriate apertures formed in the side walls 11a, 11b of the frame. At least one cooperating male and female knife assembly 8, 7 are mounted on each of the respective shafts 26 and 27, said shafts being adjustably spaced so that the knife blade 114 will intermesh with appropriate portions of the female knife assembly when said shafts are rotated. As previously mentioned, the female knife assembly shaft 26 is driven by a pulley 24 mounted on one end thereof. The structure for driving the male knife assembly shaft 27 will be set forth hereinafter.

Referring now to FIGURES 10-12 inclusive, the structure of the first embodiment of the male Y-entry knife assembly will now be set forth. The male knife assembly 8 is made up of a male die 110, a knife blade 114, a spacer 115, a ring and associated elements for adjustably assembling the aformentioned members and retaining them on the shaft 27. The male die 110 has a central aperture 110a formed therein, the diameter of which is slightly larger than the diameter of the shaft 27 on which it is to be mounted. The keyway 116 formed in the inner peripheral wall of the male die fits over the elongated key 117 mounted in the peripheral portion of the shaft 27, said key and keyway cooperating to prevent the mail die from rotating relative to the shaft 27. A set screw 111 threaded in aperture 110b bears against the key to adjustably retain the male knife assembly in position along the longitudinal length of the shaft, said aperture being substantially parallel to a diameter of the die and extending from the outer circumferential wall of the die into the keyway.

An annular portion of the male die is cut away to form a shoulder 110c, said shoulder having an outer diameter less than the outer diameter of the male die. The outer diameter of the shoulder is slightly less than the inner radius of curvature of the semi-circular spacer 115 and semi-circular knife blade 114. The axial length of the shoulder is slightly less than the axial length of spacer and knife. Four space recesses 119 are formed in the surface of the die opposite the shoulder therethrough. Thus the shoulder forms a structure for mounting the knife blade and spacer on the die as will become more apparent hereinafter.

An additional portion of the male die adjacent the shoulder 110c is milled away to form the annular flange 110d, said flange being formed integral with the die and having an outer diameter less than the outer diameter of the shoulder. The annular flange forms structure for mounting the ring 113.

The ring 113 has annular recessed portions formed in the inner planar space thereof to form a shoulder 113c. The inner diameter of the shoulder 113c is slightly more than the outer diameter of the shoulder 114a, 115a formed respectively on the knife and the semi-circular spacer. Thus when the knife 114 and spacer 115 are mounted on the shoulder 110c of the male die and the ring 113 is fitted on the annular flange 110d such that the shoulder portion 113c thereof faces inwardly towards shoulder 114a, 115a, and 110c of the knife, spacer and male die respectively, the ring will retain the knife and spacer in position to make up the male knife assembly. Once the aforementioned members of the male knife assembly have been positioned as set forth above, clamp screws 118 are inserted through the arcuate slots 110e in the male die and threaded into the corresponding openings 113b formed in the ring to hold said members in their assembled relationship.

The outer diameters of the ring and the male die are equal. On each of the outer peripheral portions of the male die and the ring there is formed curved offset portions 110f and 113f respectively. The outer radii of each of the offsets in equal to the outer radii of the knife mounted on the die. The circumferential length of the offset is less than a quarter of the circumference of the male die. Each of the offsets 110f and 113f are slanted inwardly opposite the direction of rotation (arrow 121) towards the planar surface of the knife blade to provide pointed portions 110h and 113h so that when the die and ring are assembled a V-shaped cutting surface will be formed to cut a V-shaped notch in the blank to be slotted. The curved end 110g and 113g of the offsets 110f and 113f opposite from the pointed portions are concaved outwardly for purposes to be explained hereinafter.

A portion of the annular flange 110c is cut away to form a key 110n in the outer peripheral portion thereof. A pair of transverse holes 113a parallel to a diameter of the ring are drilled in the outer periphery thereof such that they extend through the inner peripheral wall of the ring. When the ring is mounted on the die, a pair of set screws 113j threaded in the holes 113a will bear against key 110n. The pair of screws form an adjustment which will be described hereinafter. A radial aperture 110m is drilled through the male die such that a locking screw 122 may be threaded therein to engage the shaft for locking the male knife assembly in position on the male knife assembly shaft 27.

Four spaced recess portions 119 are formed in the planar surface of the male die, each of said recesses having slots 110e located in the central portion thereof. As a result of the recesses formed in the male die, the hex heads of the clamping screws 118 inserted in the slots will not extend axially out beyond the planar surface of the male die. Additionally, the recesses are semicircular such that a wrench may be used for tightening and loosening the clamping screws.

The structure of the first embodiment of the male knife assembly having been described, the structure of the first embodiment of the female Y-entry knife assembly will now be set forth. The structure of the female knife assembly 7 is the same as that of the male knife assembly except for the differences set forth hereinafter. The outer diameters of the circular portions of the female die 120 are the same as the corresponding portions of the male die 110 except there are no counter parts of the shoulder 110c or offset 110f of the male die formed in the female die.

In place of the offset 110f, a cut-out 120f is formed in the peripheral portion of the female die 120 such that the offset 110f will rotatably intermesh therein when the male and female knife assemblies are mounted on their respective shafts and rotated. Similarly a cut-out 123f is formed in the outer periphery of the female ring member 123 such that the male collar offset 113f will rotatably fit therein when the knife assemblies 7, 8 are rotated as previously set forth. Inwardly slanted radial walls 120h, 123h are formed in the cut-out portions 120f, 123f respectively to be adjusted to come within close proximity and substantially parallel to the radial walls of the pointed portions 110h, 113h as the male and female knife assemblies are rotated to form Y-entry slots in box blanks. Due to the shape of the offsets and the cut-outs the adjacent peripheral portions of the cooperating male and female knife assemblies may be rotated very close to one another without having metal portions intermeshing as said assemblies are rotated.

It should be noted that the axial thickness of the female annular spacers 125 is slightly greater than the axial thickness of the cutting portion of the knife. Similarly the outer radius of the female spacer 125 is equal to the outer radius of the knife member minus a dimension slightly greater than the radial height of the cutting portion 114b of the knife blade that extends outwardly beyond the male die.

Indents 125a, 125b are formed in the female spacers so that when the clamping screws 118 are inserted through the arcuate slots 120e formed in the female die and threaded into holes 123b in the female ring 123, the female spacer members 125 will be held in position to form a complete assembly. The indents 125b are formed in the mid section of the inner peripheral portion of the spacer.

The indents 125a, 125b are formed such that when the clamping screws are loosened, the female spacers may be readily removed from the female die and replaced with spacers of a different thickness. Similarly when the clamping screws 118 in the male knife assembly are loosened, the knife blade and the male spacer may be readily removed and replaced with a different slot knife and spacer of appropriate thickness. Thus provision is made for forming slots of different thicknesses using the same dies and ring portions.

The first embodiment of the male and female wire knife assemblies having been described, the second embodiment thereof will now be set forth. The male and female knife assemblies of the second embodiment have many similar structural features; therefore, for the most part only structural features of the second embodiment which differ from structural features the first embodiment will be set forth hereinafter.

The male knife assembly 250 includes an annular male die 252 having a central aperture 251 for mounting said assembly on a knife assembly mounting shaft 27. A radially extending aperture 259 is formed in the male die so the locking screws 122 may be threaded therein to bear against the shaft 27 for fixedly mounting said assembly on said shaft.

An annular portion 255 is cut out of the outer corner portion of the male die to form an axially extending flange 253. The annular portion cut out of the male die is rectangular in cross section. A ring 254 is provided which is the same size and shape in cross section as the aforementioned annular portion 255 except that the axial width thereof is smaller than said annular portion by a distance substantially equal to the thickness of the knife blade 275, said knife blade being mounted between the adjacent axial surfaces of said ring and male die.

The ring is retained in position on the annular flange by clamping screws 118 which are inserted through appropriate arcuate slots 257 formed in the ring and threaded into apertures in the male die, the slots being located in spaced recesses 256 similarly as the clamping screws 118 were located in spaced recesses 119 formed in the knife assembly 8. An offset 260 having a pointed portion 261 is formed on the ring 254 and the male die 252 respectively in a manner similar to which said portions were formed on the respective members of the first embodiment of the male Y-entry knife assembly 8.

In other words the main differences in the construction of the male knife assembly 250 from the knife assembly 8 are that there is no shoulder corresponding to shoulder 114a of the first embodiment nor is there a shoulder corresponding to shoulder 110c of the first embodiment formed in the second embodiment of the male knife assembly. Thus the respective adjacent faces of the male die and the knife blade, and the ring are parallel to one another.

The knife blade 275 is retained in position between the ring and the male die by a clamping screw 118 which is inserted through the arcuate slot 257 and the knife slot 276 formed in the central portion of the blade and threaded into appropriate apertures formed in the annular ring. Similarly a spacer 258 having a thickness corresponding to the thickness of the knife blade is retained in position between the ring and male die by screws 118, said spacer being located approximately diametrically across the male die from the knife blade. The radius of curvature of the outer surface of the spacer is equal to the radius of the curvature of the outer surface of the ring and of the male die. It is to be noted that the radius of curvature of the knife plate 275 is greater than the radius of curvature of the male ring and male die by an amount corresponding to the difference in the radius of curvature of the knife blade 114 with respect to the male die and ring of male knife assembly 8 of the first embodiment.

The female knife assembly 270 of the second embodiment is constructed very similar to the female knife assembly of the first embodiment. The female knife assembly 270 includes an annular female die 271 having a female ring 272 mounted on the angular flange portion 269 thereof. The female ring retains spacers 273 on the aforementioned flange portion between adjacent planar surfaces of said ring and the surface of the female die.

When the female knife assembly 270 and the male knife assembly 250 are mounted on their respective shafts and are adjusted to be used, the offset 260 will intermesh in an appropriate cut-out 278 formed in the female die and female ring 272 respectively. The aforementioned cut-out has a V-shaped portion 279 that will receive the pointed portion 261 of the male die.

The radius of curvature of the female spacers 273 are sufficiently less than the radius of curvature of the female ring and die so that the outer radial portion 284 of the knife blade 275 may track therein when the knife assemblies 250, 270 are being used. A pair of transverse openings 277 (one shown) extending parallel to a diameter of the male and female ring are formed therein respectively to extend through the annular portion thereof similarly as the openings 113a, 123a were formed in the male and female ring 113, 123 respectively.

In order to facilitate the description of the knife blade 275 of this invention it will be assumed that there are three different ranges of heights Z to be formed in box blanks. The range "A" will be considered to be slots of relatively small heights range "B" of medium height and the range "C" of relatively large heights, there being an overlap between each range. If the slots to be formed are of a height Z in the range of short heights, then the knife blade 275a is used; if in the medium range, then 275b; and if in the range of relatively large heights, then the knife blade 275c is used. As may be noted from FIG-URES 23A, 23B, and 23C, the plurality of knife blades covering the three height ranges may all be formed out of a single annular ring. As is illustrated in the aforementioned figures, the respective angular lengths are approximately 80° to 110°, and 170°; however, it is to be understood these angular lengths are merely illustrative since a plurality of blades may be constructed from a single ring for covering height ranges of slots if the angular lengths of the knife blades were of a different angular length. Also, each knife blade may be made of various other angular lengths as will be apparent as the description proceeds.

The purpose of providing a series of knife blades for cutting slots of different ranges of sizes (Z) is that if a single knife blade were provided to cover the entire range of heights of slots, then the arcuate slot 276 would be extended substantially the circumferential length of the knife blade; said arcuate slot would weaken the knife blade structure. In order to overcome this problem and also to facilitate making appropriate adjustments which will be described hereinafter, a series of knife blades of different angular lengths have been provided.

The reason for providing a series of different sizes of knife blades having been given, a description of said blades will now be set forth. The knife blade 275a used for cutting slots in the height range A is of a reltaively short circumferential length. An arcuate notch 281 is cut out of the trailing outer peripheral edge portion of the blade to form a square corner 282, the radial height of the notch being substantially equal to the difference in radial length between the outer radius of curvature of the male die and the outer radius curvature of the male knife blade. In other words, the arcuate notch is cut out of the rear portion or the portion of the knife blade that extends rearwardly from the knife assembly. The arcuate notch is cut out of the knife blade so that the square corner 282 may be positioned adjacent the pointed portion 261 and the clamping screw rearwardly of the offset 260 may be used to fix the knife blade in position. The square corner in this position cuts a slot of a very small height. The square corner is provided to yield a clean cut.

The arcuate 276a has a leading edge portion 286 which is spaced substantially behind the leading edge 283a and a trailing edge portion that extends rearwardly of the square corner 282. As previously mentioned the clamp screw 118 is fitted through the arcuate slot 276a in order to hold the knife 275a in position between the male ring and male die. The circumferential length of the slot and the cutting edge 284a determines the limits of heights in the range A that may be cut by blade 275a.

The knife blade 275b used for forming slots in the medium height range B has an arcuate slot 276b and an angular length of a longer circumferential length than the respective portions of the knife blade 275a. The square corner 282 is formed in the trailing edge of the knife blade 275b. As a result of the aforementioned location of the square corner and of the relative length of the arcuate slot to the angular length of the knife blade, there will be some overlap in the ranges of sizes cut by each of the knife blades. In other words the knife blade 275b will cut a slot of a height that falls within the lower end of the range of slots cut by the knife blade 275c and the upper end of the range of slots cut by the knife blade 275a.

The large range knife blade 275c is of a longer circumferential length than either of the previous mentioned knife blades and has the arcuate slot 276c formed in the central annular portion thereof. If the slot 276c were extended to a position adjacent the leading edge 243c, it would substantially overlap the range heights of slots cut by knife blade 275b. Additionally the arcuate slot is not extended to a point adjacent to the leading edge since to do so would substantially weaken the knife blade. Further the trailing edge 287 of the slot is located a substantial distance inwardly from the trailing edge of the knife blade for reasons similar to those for the leading edge 286 being a substantial distance behind of the leading edge 283c. As a result of the location of the trailing edge 287 the minimum range of heights of slots cut by the blade is limited. However, this location of the slot does not prevents a certain amount of overlap between the large height range and the medium height range as previously mentioned. In other words, the range of heights of slots cut by the blade 275c is limited by the location of the leading edge 287 and the trailing edge 286 similarly as the ranges of heights of slots cut by the other two blades is limited by the leading and trailing edges of their respective arcuate slots. The height of the slot cut by the knife blade is determined by the location of the clamping screw insert therethrough relative to the leading and trailing edges of the slot.

Although the knife assemblies illustrated have four spaced recesses 119 located in the planar faces thereof it is to be understood a greater number or smaller number of recesses may be provided. For example, a male die and ring having through spaced recesses 119 and appropriate apertures formed in the die may be advantageously used. In such an event the spacer 215 may be retained in position diametrically opposite the offset 260 by a pair of clamp screws. A spacer of an angular length of approximately 30° may be used in conjunction with any one of the three sizes of knife blades previously described.

For example, if the knife blade 275a were positioned between the portions of the offset 260 and it was desired to use the knife blade 275c for cutting a slot of larger height, then the clamp screw 118 that extends through the arcuate slot would be removed from the knife assembly. Upon removing the screw 118, the other two clamp screws 118 holding the spacer in position will cause the offset portion to spread axially. As a result of the offset portions spreading in an axial direction, the knife blade 275a may be removed from between the ring and male die. Having removed the knife blade 275a, the knife blade 275c may be inserted in its place.

After the clamping screw 118 is inserted in the respective openings formed in the male die, the ring and the arcuate slot 275c, it may be partially tightened. Then the length of the knife blade extending circumferentially forward in the direction of rotation of the knife may be adjusted to form the desired slot height before the screw is fully tightened.

The structure of the two different embodiments of the cooperating pairs of Y-entry knife assemblies having been described, the structure for rotatably mounting the shafts on which said assemblies are mounted will now be set forth. A pair of spaced rectangular apertures 133, 134 (see FIGURE 4) located directly above one another are formed in each of the side walls 11a, 11b of the frame for mounting the bearing housings 129, 130 therein. The bearing housings have mounted therein inner and outer races 131, spacers 132, and other conventional elements for journalling the respective ends of the knife assembly shafts; the structure in said housing being conventional, it will not be further described.

It may be noted by referring to FIGURES 2 and 4, that the vertical walls forming the bearing house apertures form a relatively close fit with said housing; and similarly the horizontal side walls of the aperture 134 form a close fit with the horizontal surfaces of the female bearing housing 129. However, the apertures 133 in which the male bearing housings 130 are mounted are of considerably greater vertical depth than the height of the vertical walls of the bearing housing mounted therein.

A strong coiled spring 137 is mounted in each of the male bearing house apertures such that one end thereof bears against the bottom surface of the said aperture while the upper end bears against the lower horizontal surface of the bearing housing, there being an offset 130a formed on the bearing housing to retain said spring in position. Since the aforementioned springs are in compression, they press the bearing housings upward against the top wall of said aperture.

Journalled for rotation in the upper portion of each of the mounting blocks 11c is a horizontal rod 140, said rod extending through apertures formed in said bearing blocks. Mounted on the end of the rod that extends outwardly from the bearing block is a handle 141.

A recess 138 is formed in each of the bearing blocks beneath and around rod 140 such that the beveled gearing 142, 143 may be mounted therein. Beveled gears 143 are mounted on the rod 140, one beveled gear being located in each recess 138. The beveled gear 142, which is driven by beveled gear 143, has an internally threaded sleeve 142a depending therefrom and mounted for rotation in the block 11c. A threaded stud 144 extends through a vertical wall 136 in block 11c such that its inner end portion abuts against the top surface of the bearing housing 130 and its upper end is threaded in sleeve 142a. A cover 148 is provided for enclosing the recessed portion of the bearing block.

When handle 141 is turned, the rotary motion imparted to the horizontal rod 140 is transmitted through the beveled gearing to cause the threaded stud 144 to move in either an upward or downward direction, the direction depending upon the direction of rotation of said handle. If the handle were rotated such that the stud were moved in a downward direction, the bearing housing would be forced downwardly to compress the spring 137. Moving the bearing housing in a downward direction would decrease the distance between the male knife assembly shaft and the female knife assembly shaft. If the handle is rotated in the opposite direction, the stud moves upwardly thus allowing the spring 137 to force the housing upwardly. Thus structure is provided for varying the distances between the two parallel knife assembly shafts 26 and 27.

It may be noted that a pair of arms 145 are mounted to be freely rotatable on rod 140, said arms carrying the cover 146. As shown in FIGURE 4, cover 146 is an open position. This cover encloses the slotter mechanism when the machine is not in use.

Referring now to FIGURE 1, 4 and 7 the structure connecting the drive mechanism to the female knife assembly shaft will now be set forth. The pulley 24 is rotatably mounted on a bushing 153 that extensd inwardly through the central aperture in said pulley, said bushing being rotatably mounted on the female knife assembly shaft. The pulley may be rotated independently of rotation by the female knife assembly shaft. The pulley 24 is retained in place by a cup 155. A conventional clutch and fork 152 and 154 are used to drivenly connect the pulley to the female knife assembly shaft. The aforementioned fork is operated by rod 151, said rod being connected to a lever 150 which is mounted under the table 30 and extends outwardly therefrom.

Referring now particularly to FIGURES 4, 6, and 7 the structure of the fisrt embodiment of the cutting control and drive mechanism generally designated 15 will now be set forth. A gear housing 165 is secured to the frame side 11c by appropriate means such as brackets 165c and bolts 165b. The housing has a cover 165c which is hingedly mounted on the side walls by hinges 165d. Enclosed within the gear housing are a plurality of gears mounted on their respective shafts, said shafts being journalled for rotation in the mounting block 11c.

The rotational movement transmitted to the female knife assembly shaft 26 through pulley 24 drives the male knife assembly shaft 27 by a system of gearing to be set forth hereinafter. A female drive gear 161 and timing gear segment 168 are secured to the opposite end of the female knife assembly shaft 26 from the drive pulley 24. The female drive gear is keyed in the shaft and drives the timing mechanism through chain 159. The timing gear segment is mounted on the shaft for limited adjustable movement relative thereto and drives the anti-backlash gear 171 and anti-backlash segment 162, said gears in turn driving the connecting gear 169. The connecting gear drives the male drive gear 160 and the anti-backlash segment 163 which are mounted on one end of the male knife assembly shaft 27.

In order to have a fine positive cutting control a micrometer timing adjustment 164 is provided. The micrometer adjustment is mounted on the end of the shaft 26 and bears against the face of the timing gear segment 168, said segment being rotatably mounted for limited movement on the annular shoulder 161a of the female drive gear 161. Three spaced curved elongated slots 166 are located in the timing gear segment outward from the shaft, said slots being approximately equal radial distances from said shaft. Inserted in these slots are bolts 174 which are threaded in appropriate apertures formed in the female drive gear. When the bolts 174 are loose, the timing gear segment may be rotated relative to the female drive gear; however, the angular displacement of the timing gear segment relative to the drive gear is limited by the length of the elongated slots.

Secured to the outer end of the female knife assembly shaft by a pair of spaced screws 164d is the micrometer timing adjustment plate 164a, said screws being inserted through appropriate apertures formed in the plate and threaded into the shaft. A circular opening 164b is made in the opposite end of the plate from screws 164d, the axis of said opening being parallel to the axis of the shaft 26. The circular opening is located adjacent the outer periphery of the timing gear segment. A pin 164c is secured in an appropriate aperture in the timing gear segment to extend outwardly through the aforementioned opening 164b, said pin having a smaller diameter than the opening. Thus provision is made for limited rotation of the timing gear segment relative to the plate.

Extending radially outwardly through the plate on the opposite sides of the opening and parallel to a diameter of the shaft 27 are a pair of threaded transverse openings having adjustment bolts 164e mounted therein, said bolts having lock nuts 164f threaded thereon. The bolts are threaded in the opening to bear against the pin. The members 164a through 164f inclusive provide a micrometer timing adjustment.

The micrometer timing adjustment is made by first loosening the bolts 174 so that the timing gear segment may be rotated relative to the female driving gear 161. Then the bolts 164e are turned in the same direction such that the timing gear segment is either rotated clockwise or counter clockwise relative to the plate 164a, said plate being stationary relative to the female knife assembly shaft. When the timing gear segment has been rotated an appropriate amount (the amount of rotation possibly being equal to the distance between the center portions of gear teeth of gear 168), the bolts 164e are tightly secured against the pin 164c by turning down the locking nuts 164f. Next the bolts 174 are "tightened down" such that the power of rotation supplied to the female drive gear is transmitted to the timing gear segment through frictional engagement of said gear and segment to lessen any danger of shearing pin 164c.

Both the connecting gear 169 and the anti-backlash gear 171 along with the bushings 178 inserted in the central apertures 179 formed in said gears 179, 171 are mounted for rotation on the respective shafts 180, said shafts being journalled for rotation in frame side wall 11a. The bushings 178 and the gears 169, 171 are retained in position on one end of shafts 180 by studs 176, said studs having an enlarged annular portion 177. Between the opposite sides of each of the gears from the studs and the frame, the bushing has an enlarged shoulder portion 178a that spaces the gears outwardly from the frame and eliminates play in the gears. The opposite end of each of the shafts 180 extends inwardly to adjacent recesses 183 formed in the side wall 11a of the frame, said recesses having a larger diameter than the shaft. The opposite end of the shaft is maintained in the frame by a cap bolt 176 secured in the end of the shaft and a washer 176a mounted on said bolt between the head thereof and the shaft, a portion of the periphery of said washer abutting against the surface forming the recess.

The anti-backlash gear 171 has an annular flange portion 171a on which the annular anti-backlash segment gear 162 is mounted for limited rotatable movement relative thereto. A pair of arcuate slots 166 diametrically opposite one another are formed in the anti-backlash gear similar to the arcuate slot 166 formed in the timing gear segment. A pair of tightening bolts 174 are inserted through the pair of diametrically opposite slots and are threaded in appropriate apertures formed in the drive gear segment 162. The anti-backlash gear and the anti-backlash segment are secured togther in tight functional engagement by tightening bolts 174 for reasons similar for using bolts 174 in the female drive gear and the timing gear segment.

Located in the outer peripheral portion of gear 171 spaced 90° from slots 166 are apertures 166b. Adjacent each of the outer two apertures 166b in the drive gear segment are a pair of elongated generally hemispherical indents 173. A stud 181 having a pointed portion 181a is threaded in said aperture such that the aforementioned point will engage the surface of the hemispherical indent. Thus, for example, by turning the stud in an outward direction, the drive gear segment 162 may be rotated until the surface of the indent again engages the point of the stud (provided bolts 174 are not tightened). After the drive gear segment has been rotated until the surface of the hemispherical indent engages the point of the stud 181, the locking nuts 182 are tightened to retain said studs in the adjusted position. After the locking nuts have been tightened, the bolts 174 are tightened such that the power transmitted from the shaft to the anti-backlash gear will be transmitted through the anti-backlash segment 162 without shearing the studs 181.

The male drive gear 160 has the anti-backlash gear segment 163 mounted thereon similarly as the anti-backlash segment 162 is mounted on the anti-backlash gear 171. Also, there are provided adjustment studs 181 threaded through the male drive gear to engage the generally hemispherical indents in the anti-backlash gears segment 163, said studs having locking nuts 182 mounted thereon to provide an adjustment as that described for members 162, 171. (The section through the male drive gear 160 and the anti-backlash segment 163 of FIGURE 4 is illustrated similar to the section 7—7 through the anti-backlash gear 171 for showing the structure thereof.) Tightening bolts 174 maintains the anti-backlash segment 163 in position relative to the male drive gear. The male drive gear is keyed on the male knife assembly shaft such that rotation of the gear causes the shaft to rotate.

Formed in the male knife assembly shaft are a pair of keyways 185 spaced outwardly from the male drive gear. These keyways each have a key 186 firmly secured therein. Mounted on the shaft outwardly from said keys is a spring loaded crankshaft 170 (FIGURE 4) that automatically disengages the hand crank (not shown) when the machine is under power, a portion of said crankshaft engaging the keys 186.

The structure of the first embodiment of the cutting control and anti-backlash mechanism having been described, the structure of a second embodiment thereof will now be set forth. The second embodiment of the cutting control and anti-backlash mechanism, generally designated 300 is illustrated in FIGURES 20, 21, and 22.

The gear housing 301 is secured to the mounting block 11c by appropriate means such as latches 302 which are held in place by bolts and wing nuts 303. Enclosed within the gear housing are a plurality of gears and gear shaft which provide a driving connection between female knife assembly shaft 304 and the male knife assembly shaft 305. The ends of the knife assembly shafts are mounted in bearing housing 129, 130, said housings in turn being mounted in appropriate apertures 134, 133 located in the frame wall. The aforementioned bearing housings are mounted in their respective bearing housing apertures 134, 133 similarly as said housings were mounted in the previous embodiment.

The female knife assembly shaft 304 extends outwardly beyond the bearing housing 129 to provide structure for mounting the female drive gear 161, said gear being keyed thereto and providing means for driving the timing and feed mechanism through the drive chain 159. The shaft 304 has a female shaft extension 306 which mounts structure to be described hereinafter. Similarly the male knife assembly shaft 305 is provided with a shaft extension 307.

The female drive gear 161 has an outwardly extending annular flange portion 161a, for mounting the female drive segment 310 thereon, said segment having a central aperture whose axis coincides with the axis of the shaft extension. A plurality of bolts 312 are extended through spaced apertures formed in the segment and threaded into appropriate apertures formed in the drive gear 161, said apertures having a longitudinal axis parallel to the axis of rotationof the shaft 306. A tapered flange bushing 311 is mounted in the aforementioned central aperture in the female gear segment to help retain said gear in a position on the shaft extension 306.

Spaced outwardly on the shaft extension 306 from the drive gear and gear segment is a hand wheel 347. The hand wheel is secured on the shaft extension by appropriate means such as a set screw 348 and key and keyway 349. The purpose of providing the aforementioned hand wheel will be set forth hereinafter.

The opposite end of the female knife assembly shaft from the female gear segment is driven by appropriatae means described heretofore. The female gear segment 310 drives a lower eccentric mounted gear 317 which in turn drives an upper eccentric idler gear 322. The idler gear 322 drives the male drive gear 334 which is rotatably mounted on the male shaft extension 307. The lower mounted gear 317 and the upper eccentric gear are mounted on a lower eccentric stud 314 and an upper eccentric stud 323 respectively, said studs being mounted in the frame side wall similarly as the shafts 180 were mounted in said side wall.

The eccentric stud 314 has a spacer 315 mounted thereon to be positioned between the sidewall and the lower eccentric mounted gear. The lower eccentric gear is mounted on a lower bushing 316, said bushing in turn being mounted on the outer eccentric portion of the stud 314. The bushing and eccentric gear are retained on the stud by a washer 319 having an axially extending pin 318, said pin being mounted in appropriate apertures formed in the washer and stud, and a locknut 326 which is threaded on the outer end of said stud 314. A lubrication aperture 327 is provided in the aforementioned stud 314.

The idler gear 322 and the structure on which it is mounted is spaced outwardly on the eccentric stud 323 by a spacer 315. Mounted within a central aperture formed in the idler gear is an upper bushing 325, said bushing having an aperture in the central portion thereof for mounting an eccentric bushing 324. The eccentric bushing 324 in turn is mounted on the eccentric portion of the upper stud 323.

The eccentric bushing has a hex head 324a formed integral therewith and has a planar face portion that abuts the planar surface of the upper bushing 325 and a portion of the idler gear. The aforementioned hex head shaft retains the eccentric bushing, idler gear and upper bushing in position and also provides structure for rotating the eccentric bushing with respect to the eccentric stud 323. The hex head 324 is maintained in position on the stud 323 by appropriate lock nuts 326. An appropriate lubrication aperture 327 is provided in the stud similarly as was provided in the lower stud 314.

The upper eccentric idler gear drives the male drive gear which is mounted on the male shaft extension 307 for limited rotatable movement relative thereto. An axially extending timing pin 335 is mounted in an aperture formed in the male drive gear adjacent the outer peripheral edge thereof.

A timing hub 341 is fixedly secured to the outer edge of the male shaft extension by a plurality of mounting bolts 336 which are threaded into appropriate apertures formed in said shaft extension. The timing hub is generally cylindrical and is mounted to have its axis of rotation coextensive with the male drive gear. The timing pin aperture 337 having a larger diameter than the diameter of the timing pin 335 is formed in the hub radially outward from the central axis thereof so that the timing pin may be extended therethrough. A pair of spaced timing hub notches 342 are cut out of the outer peripheral edges of the timing hub, one notch being formed on either side of the timing aperture. Appropriate apertures are formed in the timing hub so that adjustment bolt 338 may be mounted therein to extend from said notch inwardly to abut against diametrically opposite surfaces of the timing pin. The adjustment bolts have appropriate locking nuts 339 for locking said bolts in adjusted position.

The pair of clamp bolts 344 are inserted through arcuate slots 345 formed in the outer peripheral portion of the timing hub and are threaded into appropriate openings formed in the male drive gear, said bolts being diametrically spaced from one another and from the timing aperture. The aforementioned members 334, 335, 339, 341, 344, and 345 form an adjustment similar to that previously described for the micrometer adjustment.

It is to be noted in FIGURE 22 that a lever arm 355 is secured to the frame sidewall by means (not shown) for pivotally mounting it with respect thereto. An idler gear 356 having a bushing 357 is mounted or journalled for rotation on appropriate structure 358, said structure being connected to the end of the lever arm opposite the aforementioned pivotal connection. The drive chain 159 extends over the female drive gear 161 and idler gear 356 to the feed and timing mechanism. The aforementioned lever arm may be pivotally adjusted to vary the pressure exerted by the idler gear against chain 159 and thus form means for taking up the excess slack in said chain.

The chain tightner having been described, the structure of mechanism for cleaning the knife assemblies as they are used will now be set forth. The aforementioned structure includes cleaning fingers 210 (see FIGURES 2 and 3) which are provided for cleaning out the cut material that may clog the grooove formed in the female knife assembly. Also, cleaning fingers 211 are provided for cleaning any material that may adhere to the knife blade. As illustrated, the cleaning finger 210 is essentially a generally triangular thin piece of metal that is fastened to a clamp 195. The clamps 195 are secured on a clamp rod 193, said clamp rod being secured in a mounting member 194 which is fastened to the frame side walls. The apex 210a of the triangle extends outwardly and away from the clamp rod in a direction opposite the direction of rotation of the mounting shafts. The side 210b of the triangle adjacent the female knife assembly shaft has a radius of curvature slightly greater than that of the slot spacer 125, thus the side 210b may be mounted adjacent said spacer. With the structure of the cleaning finger 210 as provided, the apex extends inwardly into the groove in the female knife assembly and any papers or material tending to adhere to or remain in said groove will be forced out by said finger.

Similarly a cleaning finger 211 is mounted on a clamp rod 193 adjacent to the male knife assembly. The cleaning finger 211 mounted adjacent the male knife assembly performs a similar function as that of the cleaning finger 210 mounted adjacent to the female knife assembly. However, as illustrated in FIGURE 3, the cleaning finger 211 is of a generally trapezoidal construction having a side 211b adjacent the male knife assembly, said side having a radius of curvature slightly greater than the radius of curvature of the outer portion of the offset 110f. The curved edge portion of this cleaning finger will ride adjacent the curved edge of the knife blade and thus will clean any material that tends to adhere to said blade or other circumferential portions of said knife assembly.

The structure of the cleaning fingers having been set forth, the structure of two different embodiments of shoe attachments will be described.

In the event the height H of the blank to be slotted is less than the distance between the point of intermeshing of the Y-entry knife assemblies and the slide gate 47, one of the shoe attachments shown in FIGURES 8 or 9 and 25 may be attached to the appropriate apertures in the end of the slide gate or side guide. The shoe attachment 200 illustrated in FIGURE 8 comprises a mounting bracket 201 having an aperture therein located such that a screw 204 may be threaded through said aperture and into the aperture 48a in the lower end of the slide gate for securing the bracket to the slide gate.

Attached to the under surface of the mounting bracket is a bristle holder 202 having downwardly extending bristles 203 mounted thereon. Shoes having horizontal areas of different size covered by the bristles may be used for different sizes of blanks to be slotted. The lower end of the bristles bear down on the upper horizontal surface of the blanks and thus retain a pair or more of blanks in a generally horizontal position. This pressure of the bristles bearing down on the top of the blanks prevents the blanks from doubling up as the edges abut one another. Thus for example, the blank that enters into the slotter mechanism is pushed into position by a second blank which is pushed beneath the slide gate slotter mechanism by the feeder mechanism; a description of the functioning of the attachment will be set forth in greater detail hereinafter.

The second embodiment of the shoe attachments of this invention, generally designated 205 (see FIGURES 9 and 25), is made up of a pair of extension members 214, one extension member being secured to each of the side guides 54. The aforementioned extension members each include an extension guide and an extension spring made of a material such as spring steel. Since the extension members are substantially identical except that one is a right hand member and the other is a left hand member, only the left hand member will be described in detail.

The left hand extension guide 206 is generally an elongated bar which extends from the side guide 54 to a point adjacent the intermeshing of a cooperating pair of knife assemblies mounted on their respective shafts 26, 27, or 034, 305. A vertical offset 212 is formed on the front portion of the extension guide to extend upwardly therefrom and to have a vertical face lying in the same plane as a face of the rectangular notch 217 formed in said front portion of the guide. The aforementioned notch 217 is formed in the extension guide so that the elongated vertical surface of the guide will lie in the same plane with the inner vertical surface of the side guide 54 when it is secured thereto. The vertical offset 212 is secured to the side guide by a pair of flat head screws 223. It is to be noted that the rear transverse edge of the rectangular notch abuts against the transverse edge of the side guide which said extension guide is secured to.

A generally flat left hand extension spring 208 is secured to the central portion of the left hand extension guide by appropriate means such as screws 213, said spring being mounted inwardly from said extension guide. The extension spring includes a generally horizontal elongated rectangular section 208b that extends from the control gate to a point closely adjacent the intermeshing portions of the cooperating knife assemblies 8 and 9. The aforementioned elongated rectangular portion is positioned inwardly from the extension guide by a transverse rectangular section 208a which is formed integral with said rectangular section, the aforementioned screws 213 being inserted in appropriate apertures formed in the outer edge portion thereof. As may be noted in FIGURE 9 the transverse section has an S bend therein so that the extension spring may be secured to the upper horizontal surface of the extension guide while the lower horizontal surfaces of the rectangular section and the extension guide nearly lie in the same plane. It is to be noted that the forward end of the extension spring has an upwardly curved section 208c, said section being located beneath the lip of the control gate 47. The purpose of providing the aforementioned upwardly curved section will be set forth hereinafter.

As previously mentioned the right hand extension member is similar to the left hand extension member except that it is oppositely positioned. In other words the right hand extension spring 209 is mounted on the right hand extension guide 207 so that said right hand extension spring is adjacent to the left hand adjacent spring while their respective guides are spaced outwardly from one another. The lower generally horizontal plane of each of the spring members lower surface is slightly higher than the lower horizontal plane of the surfaces of the guide members; the purpose for constructing the extension in the aforementioned manner will be set forth hereinafter.

The shoe attachment 205 may also include a lower width extension 215, said extension being illustrated in a raised position in FIGURE 9 to facilitate the description thereof. The lower width extension has a horizontal leg portion 216 which extends rearwardly from the control gate 47, said leg having a lower surface laying in the same horizontal plane as the lower edge of the ears 48. The lower width extension also has a vertical leg 218 which is formed at right angles to the horizontal leg and integral with the edge portion thereof, said vertical leg having appropriate apertures formed therein so it may be secured to ears 48 by flat head screws 204.

When the shoe extension 205 is used a stock of blanks 220 (see FIGURE 25) are positioned on the table 30 so their rear edge portions abut against the control gate 47. Then the side guide 54 are moved so that their inner surfaces abut against the side edges of the aforementioned stack. Similarly the front guide 58 is positioned to abut against the stack. Next the control gate adjustment bolt 63 may be rotated so that the lower horizontal surface of the lower width extension 215 is elevated a distance above the table surface elevation slightly greater than the thickness of the blanks to be slotted.

After other appropriate adjustments have been made, said adjustments to be described hereinafter, the slotter machine is then actuated so that the rear edge 77a of the feed plate will be moved in the direction of the arrow 225. At the start of the stroke of the feed plate the rear edge thereof is in a position illustrated in FIGURE 25; and upon actuation of said machine the feed plate is moved to abut the front edge of the lowermost blank in the stack 220. The lowermost blank is pushed rearwardly in the direction of the arrow 225 to a position illustrated by blank 221, the length of the stroke of the feed plate being equaled to the distance of the line 225. At this position the blank 221 is in position to be pulled between and slotted by the cooperating pairs of knife assemblies 8 and 9.

However, if the blank 221 is of a small height such that it will not be placed in position to be pulled between the knife assemblies, then the next stroke of the feed plate will push the leading edge of the next blank against the trailing edges of blank 221 and force it one blank height further in the direction of arrow 225. If moving blank 221 in the direction of the arrow 225 one blank height is not great enough to place it between a pair of cooperating knife assemblies then another stroke of the feed plate will push a third blank from the stack 220 to force the blank 221 to a position where it may be placed between the assemblies and pulled therethrough by the rotation of the knife assemblies 8, 9.

As previously mentioned the forward edge portion of the spring guides is curved upwardly at a location beneath the control gate 47. The purpose of providing an upwardly curved portion 208c is to provide means for facilitating or assuring that the leading edge of the blanks is positioned between the lower surface of the spring guides and the top surface of the table. The elongated rectangular section 208a slopes downwardly and rearwardly from the upwardly curved section to the opposite end thereof so that the blanks will be retained in close contact with the table surface as they are moved in the direction of arrow 225.

An advantage of providing the extension spring of the construction previously described is that narrow blanks of different thicknesses may be held in position by said springs without having to make adjustments of the elevation thereof for blanks of different thicknesses ($t$). It is to be noted that the width ($b$) of the blanks 220 is slightly less than the space between inner edges of the left hand and right hand extension guides 206, 207. The inner vertical surfaces of the aforementioned extension guides retain the narrow blanks in aligned condition as they are fed from the stack of blanks 220 to a position between a cooperating knife assembly where they are slotted.

The operation and adjustment of the first embodiment of the cutting control and anti-backlash mechanism having been set forth, the operation and the adjustments of the second embodiment will now be described. It will be assumed the machine is partially disassembled to facilitate making the aforementioned description. First the male and female assembly shafts 304, 305 are removed from their mounting structure in the frame walls 11a, 11b. Next the desired number of female knife assemblies 270 are mounted on the lower shaft so that the hex heads of the clamp screws 118 face toward the drive pulley end of the shaft. After the shaft has been mounted in the aforementioned shaft mounting structure, the female gear segment 310 along with its tapered flanged bushing 311 is rigidly attached to the shaft 304.

Having attached the female gear segment to the shaft, the lower eccentric mounted gear 317 is mounted on the lower eccentric stud 314, said stud having been mounted to have the eccentricity on top. Now the stud is rotated in a counter clockwise direction until the backlash is eliminated. Then the hand wheel 347 is rotated to bring the V-shaped notch of the cut-outs on the top of the shaft to coincide with a vertical center line through said shaft.

Next the upper shaft 305 is removed and an appropriate number of male knife assemblies 250 are installed thereon, said assemblies having the hex heads of the clamp screws facing the cutting control and anti-backlash mechanism 300. Then the shaft is mounted in its bearing housings in the frame side walls. When the shaft 305 is installed the upper or male knife assemblies are to be backed off a sufficient distance so the offset portions thereof do not contact the lower knife assemblies by raising the bearing housings by turning the hand wheel 141 in the proper direction. Now the male knife assemblies are positioned in vertical alignment with the cooperating female assembly. Then the male knife assembly shaft is lowered by turning the hand wheel 141 of the bevel gear elevating mechanism until the knife blade intermeshes in to the lower slot in the female knife assembly a small amount while at the same time making sure that the offset portions do not physically contact the female assemblies.

After the upper shaft has been lowered, it is rotated in a clockwise direction (direction of arrow 329) until the offset portion of the male knife assembly is intermeshed in (contact) the cut-out portion of the female knife assembly. After the male knife assembly has been adjusted in the aforementioned manner, the drive gear 334 is positioned on the male shaft extension 307. Next the timing hub 341 is positioned on a shaft so that the adjustment bolts 338 are positioned approximately as illustrated in FIGURE 20, that is, the pin 335 extends through aperture 337. At this time the adjustment bolts are backed off until the hub can be rotated relative to the pin within the limits of the timing aperture. At this point the timing hub is secured to the shaft extension by the mounting bolts 336.

Now the upper eccentric mounted idler gear 322 having the eccentric bushing 324 mounted therein is installed on the eccentric stud 323. The aforementioned upper eccentric stud and upper eccentric bushing provides a means of adjusting the idler gear in two directions. By rotating the eccentric stud and the eccentric bushing, the upper idler gear is adjusted to eliminate the backlash between said gear and the male drive gear 334. While making the aforementioned adjustment, the timing pin in the male drive gear should not strike either side of the timing aperture. If it does, the eccentric idler gear has to be moved ahead or back one tooth in mesh. At this point the adjustment bolts 338 are tightened in the timing hub so that they bear against the timing pin but still at the same time leave the pointed portion of the offset backed away from the V-shaped notch 279 in the cut out of the female knife assembly a slight amount.

Now the hand wheel 347 is installed on the shaft extension 307. Then the machine is turned over by hand to make sure that the pointed portions of the offsets and the V-shaped notches of the cut outs do not strike but are in close proximity. During this stage of adjustment a strip or blank that will reach the entire span of slotting heads or knife assemblies to to be used is utilized. The pointed portions of the offsets are advanced into the V-shaped notch by turning the hand wheels until the first male assembly in conjunction with the first intermeshing female assembly makes a slot in the aforementioned blank. The adjustment bolts 338 are turned to advance the offsets relative to the cut outs in the direction of rotation. The adjustments are made in stages with the hand wheel being rotated to cut a slot alternately with turning adjustment bolts 338 until the first time a male knife assembly makes a clean slot without the male knife assembly striking against the female knife assembly. At this point there should be a very small clearance between the male and the female knife assemblies.

After the first cooperating pair of male and female knife assemblies have been adjusted, the adjustments previously described for assemblies 8 and 9 are made until all of the cooperating pairs of assemblies make a clean out.

In the event that the first offset cuts well in advance of the remaining offsets, the first offset is backed off in the following manner. The clamping screws 118 in the male knife assembly are loosened so that the ring 254 may be backed off sufficiently so that the point portion thereof clears the V-notch of the lower or female die.

Now the clamping screws 118 in the female knife assembly are loosened so that the female ring 272 may be adjusted relative to the male die so that the V-shaped portion of the ring clears the offset portion of the male hub. Now the clamping screws in the female knife assembly are tightened and the male ring is adjusted until the same clearance in the portion of the Y-slot formed between the male ring offset and the V-shaped notch of the female hub is obtained as that for the female ring and the male hub. Clamping screws 118 in the male assembly are tightened. The hand wheel 347 should always be alternately turned with making the above adjustments to insure that the metal portions of the respective assemblies do not strike.

Other cooperating pairs of male and female knife assemblies may be adjusted in the above described manner if necessary. When a number of heads are cutting clean on at least one side and the timing hub adjustment is made as previously described, the timing hub adjustment is locked in position by tightening the nut 339. Also the clamping bolts 344 are tightened for reasons previously set forth.

Now the final adjustment may be made by making individual adjustments on each assembly, that is, the set screws (the same as 113j and/or 123j in member 8 and 9) may be rotated in the proper direction for making the final setting.

The appropriate knife blades and spacers may be secured in position prior to the time the assemblies are mounted on their respective shafts. After the offset and V-shaped portions have been properly adjusted, the individual knife blades may be adjusted in the manner previously described to make the elongated portion of the slot 6 the desired length Z.

In the event all the knife assemblies are not being used, the un-used ones may be moved over to the side by loosening the head screw 111 and 122, and then retightening them once they have been moved. It has been found that once a male and female knife assembly have been set as a cooperating pair, they should always be used in the same pair and never in a different combination. This is to insure best usage and a longer lasting life.

The structure of the Y-entry blank slot forming apparatus having been described, the operating and adjustment of said apparatus will now be set forth. Considering all the adjustments in a "loose position," the description of adjustments to be made for the first embodiment of male and female knife assemblies will now be set forth. First at least one pair of appropriate male and female knife assemblies 8, 9 are mounted on their respective shafts such that the vertical surface of the male knife assembly lies in substantially the same plane as the corresponding vertical surface of the cooperating female knife assembly. A more detailed description of the steps that may be followed for mounting the knife assemblies was set forth in the portion of the specification relating to the second embodiment of knife assemblies. After the knife assemblies have been thus positioned the screws 111, located in the peripheral portion of the respective male and female knife assemblies are tightened so that they will engage the keys on the mounting shafts. Then the screws 122 on the opposite side of the knife assemblies are tightened to firmly engage the shaft. The screws 111, 122 in their tightened positions firmly hold the knife mounting assemblies in spaced relationship on the corresponding knife mounting shaft.

After the knife assemblies are longitudinally spaced and secured to the shafts, the handle 141, FIGURE 4, is rotated to properly space the male knife assembly above the female knife assembly. The distance between the two adjacent circumferential portions (other than the cut-out and offset) of the knife assemblies is slightly greater than the thickness of the blank to be slotted.

After the space adjustments between the knife assembly shafts have been made, the appropriate tightening bolts 174, are loosened and the studs 181 are adjusted so that the anti-backlash gear segment 162 may be rotated for minimizing the backlash between the anti-backlash gear 171 and the timing gear 168. That is, the segment 162 may be rotated to minimize the backlash and then the adjustment stud 181 may be tightened to engage the surface of the bow shaped detents to hold the segments firmly in position until the tightening bolts are again tightened. Once this adjustment has been made, the locking nuts 182 and the tightening bolts are tightened to prevent the rotation of the anti-backlash segments relative to their respective gears on which said segments are mounted in. Thus having properly adjusted the gear segment 162, it will firmly engage the teeth of the connecting gear 169 and also the gearing mounted on the end of the female drive shaft. The drive gear segment 163 is adjusted to minimize the backlash between the male drive gear 160 and the connecting gear 169 in a manner similar to the adjustment of gear segment 162.

Prior to the time the above adjustments are made, the appropriate spacers and knife blades having a width W are assembled in the male and female dies for forming the desired size slots. The portion of the knife blade extending circumferentially around the perimeter of the die outwardly beyond the pointed end 110h of offset 110f is of a length equal to the length Z (see FIGURE 19) of the elongated portion of the slot to be cut in the blank (not including the depth of the V-shaped notch).

After the knife assemblies have been mounted on the shaft, but before the screws 122 are tightened, the adjustment screws 111 bearing against the keys are tightened so that the forward edges of the point portions 110h of all the male dies are in a straight line. Next the clamping screws 118 extending through the slots 110e formed in the male dies are loosened so that the ring members may be rotated to bring the forward edge of the pointed portions 113h into the same previously mentioned straight line to "square" the male knife assemblies across the top.

Next the clamping screws 118 in the female die are loosened so that the pointed portion 123h of the female ring may be backed away from the pointed portion 120h of the male die. That is, the female ring is rotated in a direction opposite to the direction of the rotation of the shaft so that the slanted portion of the cut out is slightly back of the slanted portion of the cut out in the female die.

Now the hand crank (not shown) is engaged on the crank shaft to rotate the shafts to make sure that the metal knife assemblies do not stick during a revolution thereof. Then the shaft may be rotated to the position where the forward edge of the offset formed on the male knife starts to cut a V-shaped notch in the blank to be slotted. At this stage the micrometer adjustment is made. The tightening bolts 174 in the female drive gear are loosened and the top threaded stud 164e moved in a downward direction, so that the femal knife assembly shaft will be rotated in a counterclockwise direction if the gear 161 is stationary. This will back the pointed portions of the cut out in the female knife assembly away from the pointed portion of the offset on the male knife assembly and in the opposite direction of the normal rotation of the female knife assembly. In the event that the metal portions of the knife assembly would have meshed prior to the above micrometer adjustment then the adjustment is made as set forth above. However, if the slanted portion of the cut-outs were set back so that it would not closely intermesh with the pointed portion of the offset and form a clean slot, then the adjustment studs of the micrometer adjustment are turned in an opposite direction. Once the adjustment studs have been properly set, the tightening bolts are again tightened to firmly hold the drive gear segment in position relative to the drive gear. In other words the micrometer adjustment is made so that a clean cut is obtained by at least one set of pair of knife assemblies and still not have any of the knives "strike" one another.

If the micrometer adjustment is not made and the pointed portion of the cut-out is too far advanced relative to the direction of rotation of the pointed portion of the offset, then there will be a meshing of metal against metal; however, if the adjustment is too far off in the opposite direction then there will not be a clean shear of the material out of the slot formed in the blank and there may be a tendency for the material to tear rather than be sheared out of the blank.

After the micrometer adjustment has been made, any of the knife assembly members which are not cutting properly are individually adjusted by "positioning" the rings and die members in the manner previously set forth. That is, the clamping screws in the male assembly may be loosened so that the male ring may be "positioned" to form a clean cut with the female hub. Then the clamping screws in the female assembly may be loosened to permit the female ring to be adjusted so that said ring and the male die form a clean cut in a blank. After the female ring and male die are adjusted, a fine adjustment is provided by screws 113j, 123j which bear against the keyways 120 and may be adjusted so as to rotate the knife rings in the appropriate direction. The set screws 113j, 123j in the ring members are also adjusted to bear against key 117 to retain the ring and die in the adjusted position until the clamping screws 118 are secured in place. Now the clamping screws are tightened and then the shafts are rotated to see that they cut properly. If they do not, further individual assembly adjustments are made.

After all the aforementioned adjustments have been made, then the clamping screws of the respective male members are loosened sufficiently to allow the knife blade 114 to be rotatably adjusted therein to form a slot 6 of the desired length 7. The slot length adjustment is made as previously set forth. The adjustment of the slotter mechanism having been set forth, the adjustment for retaining blanks 7 of different sizes in position to be fed to the slotter mechanism will be described.

The clamping bolts 57 inserted in the T-shaped brackets 56 secure said brackets to gibs 57a for slideably mounting said brackets in guideway 44. Thus provision is made to adjust the front and side guides 58, 54 in a transverse direction to enclose an area slightly larger than the corresponding areas of the blank to be slotted. After the front and side guideways are positioned in a transverse direction, the front guides 58 are adjusted in a longitudinal direction through the use of clamp 60.

Next, the adjustment bolt 63 in the top portion of the plate 40 is rotated to move the shoe above the table a distance slightly greater than the thickness of the blank to be slotted if a shoe attachment is used. A feed plate 77 having a thickness slightly less than the thickness T of the blank to be slotted is secured to the slide bar 70. If the blanks are very thin, then it becomes impractical to make a feed plate having a thickness less than that of the blanks. In such a case, the feed plate used has a thickenss a little less than twice the thickness of two blanks. It follows that two blanks are to be slotted simultaneously. Similarly the spacing between the control gate 47 and the table is adjusted such that the two blanks may be passed therethrough.

After the guide mechanism has been adjusted, the hand crank or hand wheel 347 is rotated so that the cam gearing apparatus moves the feed plate to its most forward position (furthest from the control gate). Then the adjustment nut 94 is loosened so that the feed plate and the slide bar on which it is mounted may be moved without rotating the cam. The leading edge of the feed plate (to left in FIGURE 3) is positioned slightly forward of the trailing edge of the blank. Thus the trailing edge of the blank is ready to be passed beneath the forward edge of the control gate as the trailing edge of the blank is engaged by the feed plate and pushed toward the knife assemblies. Now, the adjustment nut 94 is tightened to retain the positions of the slide bar, pusher plate and roller in their adjusted positions relative to the heart-shaped cam.

The hand crank is then rotated so that the knife assemblies are in a cutting position or slightly beyond so that only the length of the offset and the V-shaped portion of assemblies 8 and 9 having a circumferential dimension equal to the depth of the V notch remains to be rotated through the slot forming portion of cycle of operation of the machine. At this state, the cap screw 107a securing the dial 106 in place relative to the cam drive shaft is loosened and the appropriate timing adjustment is made.

By loosening the cap screw 107a which holds the sprocket 105 between the dial 106 and the disc 104, the dial and disc and shaft 99 may be rotated while the sprocket 105 is not turned, said dial being keyed on the shaft so that it may be moved longitudinally along the shaft but not rotated relative thereto. The dial is then rotated so that the feed plate abuts against the trailing edge of the blank when the leading edge of the blank is in position to be slotted. By rotating the hand crank to back off the knife assemblies, the depth D of the V-shaped notch portion of the Y-slot may be varied. In other words, the slide bar 70 is adjusted by rotating the dial and shaft 99 so that the leading edge of the blank will encounter the pointed portion of the knife assemblies which will cut the required depth of V in said blank. Once the slide bar has been adjusted in the appropriate direction by turning the dial, the cap bolt 107A is tightened so that the washer 107 and dial forces the sprocket 105 into tight frictional engagement with the disc 104. Using the foregoing adjustment, the entrance of the blank between the knife assemblies is set so that the desired depth D V-shaped notch is cut, it being understood that the angle of the V may be varied by using different dies and rings.

In FIGURE 3 there is shown a chute 5 that is slanted downwardly and outwardly from the cutting knives. The rear edge of the chute (that closest to the female knife assembly) is below and directly under the cutting knives. The purpose of the chute is to provide a surface onto which the slotted blanks may fall.

Referring now to FIGURES 13 to 18 inclusive, the relative positions of the the male knife assembly, the female knife assembly and the blank 7 will be briefly set forth as a slot 6 is cut in said blank. All the adjustments have been made and the feed plate has advanced a blank to the position illustrated in FIGURE 13. At this point, the cooperating male and female knife assemblies have been rotated slightly beyond the position where the pointed portion of the offset intermeshed with the V-shaped notch formed in the female knife assembly. At this stage, the V-shaped portion of the Y-entry slot is formed. As the shafts continue to rotate (FIG. 16), the V-shaped notch is cut out. As the male knife assembly is further rotated in a clockwise direction and the female knife in a counter clockwise direction, the circumferential portion of the knife blade extends through the blank to intermesh in the space between the female die and the female ring (see FIGURE 14) to cut the elongated portion of the Y-entry slot.

As the knives are further rotated to advance a blank to the position shown in FIGURE 15, the knife blade finishes cutting the slot, and the cutting edge of the knife is just spaced above the blank. At this point there is a space between the peripheral portion of the male knife assembly and the female knife assembly; however, the rotation of the female knife assembly will advance the blank so that it will fall onto a table or onto the chute previously described. If desired a curved strip 360 (see FIGURE 10) of plastic or rubber may be attached to a male knife assembly to extend rearwardly from the offset to have an outer radius of curvature substantially equal to the outer radius of curvature of the knife blade. The strip holds the blank in frictional engagement with the female knife assembly so that the blank is positively advanced as the knife assemblies are rotated. The length of strip used in part would depend on the the height of the blank to be slotted. It may be attached, for example, by gluing it to the male disc.

As may be observed from FIGURES 13–18, the length of the slot cut is dependent upon the circumferential length of the knife blade that extends rearwardly of the pointed portion of the offset. Thus by properly positioning the knife blade in the male knife assembly, a slot having a length nearly equal to the circumferential length of the knife blade that extends rearwardly of the offset may be cut. However, it is not desirable to use a knife blade that is over one-half of the circumference of the male die; since if the blade were used to cut a very short slot in the blank, the opposite end of the knife blade would enter the front portion of the blank and cut a slot therein and thereby weaken the blank. Additionally, using a knife blade having a circumferential length over half the same length of the male die would make it difficult if not impossible to interchange one blade with another without taking the whole assembly off of the knife assembly mounting shaft.

As illustrated in FIGURE 19 a plurality of pairs of knife assemblies are mounted on their respective shafts. The slots cut in the blanks may be of different widths W or different lengths (Z+D). Cutting slots of different sizes is accomplished by adjusting a knife blade such that the cutting portion extends further behind the offset and remains in contact with the blanks for a longer period of time than a second knife mounted in another male knife assembly which cuts a shorter slot in said blank. Similarly, if it is desired to cut a wider slot in a blank than is being cut by the knife assembly, a knife blade having a greater axial width may be placed in the male knife assembly than the one presently mounted therein, and a spacer of an appropriate width may be placed in the female knife assembly.

Although one method of adjusting the machine has been set forth it is to be understood that the precise order of steps set forth in this application for adjusting the machine need not be followed. However, from present experience it has been found that the adjustments may be made in a relatively short period of time following the steps set forth. Further, it is to be understood that one pair of knife assemblies consisting of a male and female knife assembly may be used with this mechanism or a plurality of cooperating pairs of said assemblies may be used, the number used depending upon the number of slots to be cut in said blanks and being limited by the width of the male die used. In other words a minimum spacing between the plurality of slots formed in a blank would be determined by the width of the respective knife members that are mounted adjacent to one another on the shaft. Similarly the maximum number of slots that may be cut in any one given blank is determined by the longitudinal length of the knife assembly shaft, the length of the blank to be slotted, and the width of the knife assemblies to be mounted on said shaft.

Further, it is to be understood that the male and female knife assemblies may be used on other slotting machines than the ones having the square structure described herein. However, for best results anti-backlash and cutting controls should be provided. If the anti-backlash and cutting controls are not provided then clean cut slots are hard to obtain and the variations in sizes of slot cut are limited.

Additionally it is to be understood that the knife assemblies 8, 9 may be used with a machine having the anti-backlash and cutting control mechanism 300 similarly as the knife assemblies 250, 270 may be used with a machine having the anti-blacklash and cutting control mechanism 15. However, it has been found that the anti-backlash and cutting control mechanism 300 provides a "closer adjustment" of the knife assemblies than the mechanism 15.

It is obvious from the foregoing description that the angle of the V-notch of the Y-entry slot would depend upon the castings or die members used to make up the knife assemblies. In other words, this angle would depend upon the angle of the point of the offsets of the male members and the angle of the recessed portion cut into the female members.

As many widely apparent different embodiments of this invention may be made without changing the spirit or scope thereof, it is to be understood that I do not limit myself to specific embodiments described herein.

What I claim is:

1. Apparatus for forming slots in box blanks comprising a frame, a first shaft rotatably mounted on the frame, a second shaft rotatably mounted on the frame parallel to the first shaft, means on the frame for drivingly rotating said first and second shafts, a pair of cooperating knife means mounted on the shafts to rotate with the shafts for forming slots in the box blanks as the blanks are passed between the shafts, said knife means including a male knife assembly mounted on one of said shafts, said male knife assembly comprising a curved knife blade, an annular male die, a ring removably attachable to the male die for holding the male knife blade therebetween, said male die and ring each having an outwardly extending offset formed integrally therewith of a circumferential length less than one-half of the circumference of the male die and male ring respectively, said offsets being slanted inwardly toward a plane perpendicular toward the axis of rotation of the male knife assembly to form in a box blank a substantially V-shaped notch that extends in the direction of rotation of the male knife assembly and means for clampingly retaining the knife blade, ring and male die together in various selected limited adjusted angular positions relative to one another while retaining the same axial relationship of said knife blade, ring and male die; and a female knife assembly mounted on the other shaft, said female knife assembly including an annular female die and a ring member removably attachable to the female die with a space intermediate the female die and ring member, said female die and ring member each being integrally formed and including a radially inwardly extending cutout portion formed in the outer peripheral portion thereof and shaped to permit a close intermeshing fit with the offsets of the male die and ring when the male knife assembly and female knife assembly are mounted on respective shafts to have the circumferential surfaces located in close proximity to one another and means for clampingly retaining the ring member and female die together in various selected limited adjusted angular positions relative to one another while retaining the same axial relationship of said ring member and female die.

2. An attachment to be mounted on the shaft of a blank slotting machine having a cooperating female knife assembly mounted adjacent said shaft for cutting a generally V-shaped notch in a blank comprising an annular male die, a ring, said male die and ring each having a radially outwardly extending offset extending angularly through a circumferential length of less than ½ of the circumference of the male die and ring respectively, said offsets being axially slanted inwardly toward plane perpendicular to the axis of rotation of the shaft to form in a box blank a substantially V-shaped notch that extends in the direction of rotation of the shaft and means for attaching the ring to the male die with the respective offsets adjacent one another to selectively permit limited angular adjustment of the die relative to the ring while maintaining the same axially relationship of the die to the ring, said male die and ring having cooperating key and key way portions into which the key extends, and a set screw in a key way portion to bear against the key for selectively varying the angular position of the die relative to the ring a limited amount and maintaining said ring and die in an angularly adjusted position.

3. An attachment to be mounted on the shaft of a blank slotting machine having a cooperating male knife assembly mounted adjacent said shaft for cutting a generally V-shaped notch in a blank comprising an annular female die, a ring, said female die and ring each having a radially inwardly extending notch extending through an arc of less than ½ of the circumference of the female die and ring respectively, said notches being axially slanted inwardly toward a plane perpendicular to the axis of rotation of the shaft to form in a box blank a substantially V-shaped notch extended in the direction of rotation of the shaft, and means for attaching the ring to the female die with the notches adjacent one another to selectively permit limited angular adjustment of the die relative to the ring while maintaining the same axially relationsip of the die to the ring, said female die and ring having cooperating key and key way portions into which the key extends and a set screw in a key way portion to bear against the key for selectively varying the angular position of the ring relative to the die a limited amount and maintaining said ring and die in an angularly adjusted position.

4. An attachment mountable on the first shaft of a box slotting machine that includes a second knife assembly mounted on a second shaft which extends parallel to said first shaft to cooperate with said second knife assembly for forming a V-shaped notch portion in a box blank comprising a first knife assembly that includes an annular die, a ring, said die and said ring each having corresponding arcuate circumferential portions of one radius of curvature and a second arcuate circumferential portions of a second radius of curvature that is of a different radial dimension than said first radius and generally radially extending surface portions joining the respective arcuate portions that slant axially inwardly toward the axis of rotation of the first shaft to cooperate with the second knife assembly to form a V-shaped notch portion, said die and ring respectively having cooperating key and keyway portions, means adjustably mounted in the key way portion to bear against the key for selectively varying the angular position of the die relative the ring a limited amount with the die and ring in the same axial relationship, and means for clamping the die and ring in an adjusted relationship.

5. An attachment mountable on a first shaft of a box slotting machine that includes a second knife assembly mounted on a second shaft which extends parallel to said first shaft to cooperate with said second knife assembly for forming a V-shaped notch portion in a box blank comprising a first knife assembly that includes an annular die having an annular axially extending flange, a ring removably mounted on said flange to form an arcuately extending groove between adjacent surfaces of said die and ring, said die and said ring each having integrally formed corresponding arcuate circumferential portions of one radius of curvature and second arcuate circumferential portions of a second radius of curvature that is of a different dimension that said first radius of curvature and generally radially extending surface positions joining the respective arcuate portions that slant axially inwardly toward the axis of rotation of the shaft to cooperate with the second knife assembly to form a V-shaped notch portion means in said groove axially spacing adjacent radial surfaces of the ring and die, and means coacting with the die, spacer means and ring for clampingly retaining said die, spacer means and ring in various limited adjusted angular assemblied relationships.

6. The attachment of claim 5 further characterized in that said spacing means comprises knife means for forming a slotted portion in said blank that provides a continuation of the V-shaped notch portion, said knife means having a curved cutting edge of a radius of curvature substantially equal to the maximum radius of curvature of the two aforementioned radiuses of curvature and an arcuate slot formed therein, said arcuate slot being curved similarly as said cutting edge, said clamping means including a clamp screw extended through said arcuate slot to attach the ring to said die.

7. The attachment of claim 6 further characterized in that said ring includes a portion having a key way, that said die has a key extendable into said key way and that there is provided means mounted by the key way portion for bearing against opposite surfaces of said key to adjustably vary the angular relationship of the die to the ring a limited amount and retain the die and ring in the adjusted angular position.

8. The structure of claim 7 further characterized in that the first shaft has a key, that said die has a key way into which the shaft key extends and that an adjustment member is mounted in the die to bear against a generally radially extending surface of the shaft key for varying the angular position of the die relative the shaft key and retaining it in said varied angular position.

References Cited by the Examiner

UNITED STATES PATENTS

| | | | |
|---|---|---|---|
| 1,012,538 | 12/11 | Fisher et al. | 83—332 |
| 1,103,695 | 7/14 | Sickler | 93—58.2 |
| 1,129,481 | 2/15 | Gores | 93—58.2 |
| 1,574,633 | 2/26 | Myover | 83—101 |
| 1,670,314 | 5/28 | Pearsall | 83—332 |
| 1,746,178 | 2/30 | Alexandescu | 74—440 |
| 1,856,433 | 5/32 | Schillo | 83—671 |
| 1,861,913 | 6/32 | Gannon | 83—671 |
| 1,968,242 | 7/34 | Birch | 83—505 |
| 1,986,139 | 1/35 | Cumfer | 83—671 |
| 2,010,567 | 8/35 | Schwamb | 83—417 |
| 2,117,220 | 5/38 | Sieg | 83—917 |
| 2,577,084 | 12/51 | Laxo | 271—54 |

ANDREW R. JUHASZ, *Primary Examiner.*

ARTHUR B. MILLER, CARL W. TOMLIN, HUNTER C. BOURNE, Jr., WILLIAM W. DYER, Jr.,
*Examiners.*